(12) United States Patent
Alvarez Diez et al.

(10) Patent No.: US 8,836,955 B2
(45) Date of Patent: Sep. 16, 2014

(54) DEVICE AND METHOD FOR MEASURING A SURFACE

(75) Inventors: Cristina Alvarez Diez, Aalen (DE); Frank Hoeller, Aalen (DE); Bernd Spruck, Moegglingen (DE); Marc Tremont, Schorndorf (DE)

(73) Assignee: Carl Zeiss AG, Oberkochen (DE)

( * ) Notice: Subject to any disclaimer, the term of this patent is extended or adjusted under 35 U.S.C. 154(b) by 772 days.

(21) Appl. No.: 13/061,783

(22) PCT Filed: Aug. 22, 2009

(86) PCT No.: PCT/EP2009/006108
§ 371 (c)(1),
(2), (4) Date: Mar. 2, 2011

(87) PCT Pub. No.: WO2010/025847
PCT Pub. Date: Mar. 11, 2010

(65) Prior Publication Data
US 2011/0176146 A1  Jul. 21, 2011

(30) Foreign Application Priority Data
Sep. 2, 2008 (DE) .................. 10 2008 045 387

(51) Int. Cl.
G01B 11/24 (2006.01)
G01B 11/14 (2006.01)
G01B 11/00 (2006.01)
G01S 7/481 (2006.01)
G01S 17/10 (2006.01)
G01S 13/46 (2006.01)

(52) U.S. Cl.
CPC .............. G01B 11/002 (2013.01); G01B 11/24 (2013.01); G01S 7/4817 (2013.01); G01S 17/10 (2013.01); G01S 2013/466 (2013.01)
USPC ......................................... 356/614; 356/601

(58) Field of Classification Search
USPC ............... 356/5.02–5.09, 601, 606–609, 614, 356/622, 624
See application file for complete search history.

(56) References Cited

U.S. PATENT DOCUMENTS 4,770,526 A * 9/1988 Manhart et al. .............. 356/5.07
4,818,100 A   4/1989 Breen
(Continued)

FOREIGN PATENT DOCUMENTS

DE    1 031 005     5/1958
DE   44 39 298    11/1994
(Continued)

OTHER PUBLICATIONS

Office Action for DE 10 2008 045 387.0 issued on Jul. 21, 2009 (English translation).

(Continued)

*Primary Examiner* — Kara E Geisel
*Assistant Examiner* — Dominic J Bologna
(74) *Attorney, Agent, or Firm* — Preti Flaherty Beliveau & Pachios LLP

(57) ABSTRACT

A device for measuring a surface (2) comprises a light source (3), a light directing device (4-6), a detector arrangement (10) and an evaluation circuit (15). The light source (3) generates a sequence of light pulses with a repetition rate. The light directing device (4-6) is controllable to direct the sequence of light pulses onto a surface area (25) of the surface (2). The surface area may be selected from plural surface areas (25, 27). The detector arrangement is configured to receive at least one light signal (21-24) scattered and/or reflected by the surface area (25). The evaluation circuit (15) is coupled to the detector arrangement (10) and is configured to determine a phase difference between a reference signal (19) derived from the sequence of light pulses and a signal component of the at least one light signal (21-24), in order to determine a position of the surface area (25). In doing so, the phase difference is determined for the signal component which has a frequency corresponding to a multiple of the repetition rate.

19 Claims, 14 Drawing Sheets

(56) References Cited

U.S. PATENT DOCUMENTS

| | | | |
|---|---|---|---|
| 4,856,893 A * | 8/1989 | Breen | 356/5.09 |
| 5,745,229 A * | 4/1998 | Jung et al. | 356/73 |
| 6,373,557 B1 * | 4/2002 | Mengel et al. | 356/4.07 |
| 7,358,516 B2 | 4/2008 | Holler et al. | |
| 7,440,112 B2 | 10/2008 | Kurokawa et al. | |
| 2008/0074637 A1 | 3/2008 | Kumagai et al. | |
| 2008/0180650 A1 * | 7/2008 | Lamesch | 356/5.01 |

FOREIGN PATENT DOCUMENTS

| | | |
|---|---|---|
| DE | 691 26 035 | 8/1997 |
| DE | 101 18 392 | 4/2001 |
| DE | 11 2005 001 980 | 7/2007 |
| EP | 1 903 302 | 3/2008 |
| WO | WO/92/07233 | 4/1992 |

OTHER PUBLICATIONS

Minoshima K. et al., "High-accuracy measurement of 240-m distance in an optical tunnel by use of a compact femtosecond laser," Applied Optics, Optical Society of America, vol. 39, No. 30, Oct. 20, 2000, pp. 5512-5517.

Minoshima K. et al., "Ultrahigh dynamic-range portable distance meter using an optical frequency comb," Conference on Lasers and Electro-Optics, 2006 and 2006 Quantum Electronics and laser Science Conference, CLEO/QELS 2006. ISBN: 978-1-55752-813-1. Doi: Digital Object Identifier: 10.1109/CLEO.2006.4627906.

* cited by examiner

DEVICE AND METHOD FOR MEASURING A SURFACE

FIELD OF THE INVENTION

The present invention relates to a device and a method for measuring a surface. The present invention relates in particular to a device and a method for measuring a surface using an optical measurement technique.

BACKGROUND OF THE INVENTION

There is a variety of applications for measuring a surface contour of three-dimensional bodies, for example in digitizing spaces, as employed for issues relating to statics in civil engineering or for multimedia applications, or in quantitative quality control, in particular in industrial production. In this case, the high-precision measurement of very large objects having a characteristic dimension of a few meters with a resolution in the micrometer range represents a challenge.

For the measurement of object surfaces with the aid of optical-geometrical techniques, such as the fringe projection and deflectometry, there is an interconnection between lateral resolution and depth of field. This has the effect that optimizing one variable gives rise to a worsening of the respectively other one, and that it is thus difficult to attain lateral accuracies in the micrometer range over depths of fields of a few meters.

Tactile coordinate measuring machines attain high precisions in volumes of a few cubic meters. These measurements can, however, be time-consuming, in particular when positions of a large number of points distributed over the surface of the measurement body are to be determined. Coordinate measuring machines for objects having characteristic dimensions in the range of meters are massive, non-mobile apparatuses. Moreover, the use of a tactile measurement has no, or only limited, applicability to sensitive surfaces.

Laser path length measuring devices allow the distance of an object to be determined. In K. Minoshima and H. Matsumoto, "High-accuracy measurement of 240-m distance in an optical tunnel by use of a compact femtosecond laser", Applied Optics, Vol. 39, No. 30, pp. 5512-5517 (2000), a distance measurement using frequency combs under laboratory conditions is described. While the measurement can be made with a high precision, it is limited to one dimension and requires light reflection on the object.

EP 1 903 302 A2 describes an optical device which combines a sinusoidal amplitude modulation with a pulsed light output of a light source in order to determine a distance of an object. In DE 11 2005 001 980 T5, a method and a device are described in which frequency comb light is coupled into an optical interferometer to perform a distance measurement. An observation depth in the object is controlled by closed-loop control of a modulation signal. The surface of an object can neither be measured with the method of EP 1 903 302 A2 nor with the method of DE 11 2005 001 980 T5.

SUMMARY OF THE INVENTION

It is an object of the present invention to provide an enhanced device and an enhanced method for measuring a surface. In particular, the invention has the object to provide such a device and such a method which allows a surface to be measured with a high resolution, wherein the measurement is contact-free and can be performed using a comparatively compact device.

According to the invention, this object is achieved by devices and a method as recited in the independent claims. The dependent claims define preferred or advantageous embodiments.

The devices and method which are provided allow a surface to be measured. Measuring a surface herein is understood to refer to, typically, determining three spatial coordinates, or also determining two spatial coordinates if the measurement is carried out in one plane only, of plural surface areas of the surface. The dimensions of the surface areas can in this case be very small and are typically determined by a cross-sectional area of a light beam on the surface.

A device for measuring a surface according to an aspect comprises a light source, a light directing device, a detector arrangement and an evaluation circuit. The light source is configured to generate a sequence of light pulses with a repetition rate. The light directing device can be controlled such that the sequence of light pulses is directed onto a surface area of the surface. By controlling the light directing device, the surface area is selected from plural surface areas, onto which the sequence of light pulses can be directed. The detector arrangement is configured to receive at least one light signal scattered and/or reflected by the surface area. When the sequence of light pulses is irradiated onto the surface area in operation, the at least one light signal comprises the reflected and/or scattered sequence of light pulses. The evaluation circuit is coupled to the detector arrangement and is configured to, for determining a position of the surface area, determine a phase difference between a reference signal derived from the sequence of light pulses and a signal component of the at least one light signal, the signal component having a frequency which corresponds to a multiple of the repetition rate. The reference signal may be any signal which can be used as reference for determining a phase difference. For example, the reference signal can be provided by a sync output of the light source or can be recorded by a reference signal detector.

Herein, a spectral component of the light signal as a function of time, i.e. of the light intensity as a function of time, is referred to as a signal component. The reference signal may essentially have the frequency which corresponds to the multiple of the repetition rate, or the reference signal may have a reference signal component, i.e. a spectral component, having this frequency, wherein the phase difference can be determined as phase difference between the signal component and the reference signal component.

This device allows a surface to be measured in a contact-free manner. With the phase difference being determined based on a signal component having a frequency which corresponds to a harmonic of the repetition rate, a high spatial resolution can be attained, because the higher frequency gives rise to a larger phase difference for a given difference in a path length.

The light directing device can be controlled such that plural sequences of light pulses are directed onto different surface areas in a sequential manner, for example by tilting a mirror in the light path of the sequence of light pulses. For each one of the surface areas, the position can be determined based on a phase difference of a signal component of the scattered sequence of light pulses having a frequency which is a multiple of the repetition rate, in order to attain a better spatial resolution. The surface is measured by sequentially determining positions for plural surface areas.

The detector arrangement may comprise a plurality of detectors which receive a plurality of light signals scattered by the surface area into different directions. In this case, the evaluation circuit may determine a plurality of phase differences associated with the plurality of light signals, with each one of the phase differences being determined for a signal component of the respective light signal, with the signal component having a frequency which is a multiple of the repetition rate. With this detector arrangement being configured to detect light signals which were scattered or reflected into different directions by the surface area, the distance of the surface area from plural reference points can be determined. The position of the surface area can be determined based on the thus determined plural distances, for example using trilateration.

The detector arrangement may comprise at least three detectors. In this case, the evaluation circuit may determine the position of the surface area based on the determined at least three phase differences. The position of the surface area can be determined using techniques such as trilateration.

More detectors can be provided in order to enhance the accuracy of position determination. The detector arrangement may also comprise at least four detectors. Measuring four phase differences allows the position determination to be carried out even if an irradiation position, from which the sequence of light pulses is irradiated onto the surface area, is unknown. The evaluation circuit can then be configured to also determine a path length between the light directing device and the surface area based on the determined four phase differences. The light directing device can be provided with focusing optics for the sequence of light pulses, which is adjustable based on the determined distance between the light directing device and the surface area such that the irradiated light is focused onto the surface area. In this manner, lateral dimensions of the surface area can be reduced, and the lateral resolution of the surface measurement can be enhanced. Ideally, the irradiated light is focused onto the surface in a diffraction-limited manner.

The light directing device can be configured in various ways in order to allow the surface to be sampled in that plural sequences of light pulses are irradiated onto plural surface areas in a sequential manner. The light directing device may have at least one adjustable optical element, for example a deflection mirror or a deflection prism, the position and/or orientation of which can be altered. The surface can be automatically measured by controlling the adjustable optical element using a suitable actuator.

The light directing device may also comprise a hand apparatus. For example, an optical pointer device can be used, which receives the sequence of light pulses via an optical fibre and outputs it into a direction in which an axis of the pointer device is held. Thereby it becomes possible that a user effects determining the position of a selected surface area in that the sequence of light pulses is directed onto the surface area using the hand apparatus. According to some embodiments, the device allows the position of the surface area to be determined even when the distance between the hand apparatus and the surface is unknown. The surface can be measured by sequentially determining, in a user-defined manner, the positions of surface areas which the user can select in a simple manner by pointing the hand apparatus towards the respective surface area.

The detector arrangement and the evaluation circuit can be integrated into one apparatus, wherein the detectors of the detector arrangement can be arranged on a side face of a housing of the apparatus, in order to realise a compact construction and a high flexibility of operation of the detector arrangement and evaluation circuit.

The device may have at least one reference signal detector. The reference signal detector is arranged such that it detects a portion of the sequence of light pulses generated by the light source as a reference signal. The reference signal detector is coupled to the evaluation circuit to provide the reference signal thereto.

The evaluation circuit may use the reference signal in various ways for determining the phase difference. The phase difference may be determined as a phase difference between a reference signal component of the reference signal and the signal component, with the reference signal component and the signal component respectively having the frequency which corresponds to the multiple of the repetition rate. Additionally or alternatively, the reference signal may be used to mix down the signal component of the at least one light signal to a lower frequency. The down-conversion is advantageously implemented such that the phase difference which is to be determined remains essentially unaltered by the down-conversion. The down-conversion may also be realised in a multi-stage process via an intermediate frequency range. In this case, different reference signal components can be used to first mix down the signal component into the intermediate frequency range and then to the lower frequency, in particular to the repetition rate. Using down-conversion while maintaining the phase difference corresponding to the original frequency, the phase difference can be determined between signals having lower frequencies.

If at least two different reference signal components of the reference signal are used, for example to mix down the signal component in plural stages, plural reference signal detectors are advantageously provided. As plural reference signal detectors are provided for detecting the reference signal, the components in the respective signal processing paths of the evaluation circuit can be specifically selected with regard to the reference signal components which are respectively required in the signal processing path. For example, an input amplification of the signals supplied by the two reference signal detectors can respectively be implemented using an amplifier which is specifically selected with regard to having a good performance characteristic in the frequency range in which the frequency of the reference signal component in the respective signal processing path lies.

Determining the phase difference by the evaluation circuit can be implemented in an iterative manner, such that, for plural signal components of the light signal having different frequencies, an associated phase difference is respectively determined. In this case, signal components having increasingly higher frequencies, i.e. signal components having larger multiples of the repetition rate as frequencies, may be selected with increasing iteration count. Thereby, the accuracy with which the position of the object is determined can be improved iteratively. This is in particular advantageous if determining the position of the object requires that the position of the object is already known in advance with a certain accuracy.

Various measures can be provided to increase the signal level of the detected light signals and to allow the surface to be reliably measured based on light scattered by the surface. For example, each detector of the detector arrangement may be provided with an optical element, in particular a focusing lens or a concave mirror, in order to increase the signal level. A blocking device can suppress an impingement of light onto the detector and/or a signal processing in an associated signal processing path of the evaluation circuit during a time interval in which no scattered light pulse can impinge onto the detector. Thereby, noise which arises during the time intervals in which no useful signals arrive at the detectors can be suppressed.

The light source may comprise a short pulse laser, which may be electrically or optically pumped, for example. However, any other suitable signal source may also be used which is configured to output an optical signal which has a fundamental frequency and pronounced harmonics, i.e. high harmonics of fundamental frequency, with a high precision.

The device may be used in all fields of application in which a surface is to be measured. For example, the device may be used for digitizing spaces or in quantitative quality control.

According to a further aspect, a detection and evaluation device for determining a position of an object is provided, onto which object a light beam having a modulated intensity is irradiated from an irradiation position. A detector arrangement having a plurality of detectors is provided to detect a plurality of light signals scattered and/or reflected by the object. An evaluation circuit is coupled to the detector arrangement to determine for each light signal an associated phase difference between a reference signal and a signal component of the light signal. In the device, a number of the detectors and an arrangement of the detectors of the detector arrangement is selected such that the position of the object can be determined based on the phase differences even if the irradiation position of the light beam is unknown. Herein, a position in the beam path of the light beam from which the light beam is irradiated onto the object is referred to as irradiation position.

Because, in a device having such a configuration, a number of detectors are provided in a spatial arrangement which allows a sufficiently large number of light signals reflected and/or scattered by the object to be received in order to eliminate an unknown distance between object and irradiation position when determining the position, the device allows the position to be determined even if the irradiation position varies significantly. Thus, a position determination can be carried out also if the irradiation position is changed with a hand apparatus, a robot arm or another actuator which cannot be controlled with a high accuracy, in order to scan or sample the surface of the object.

The detector arrangement may comprise at least four detectors which are arranged such that at maximum two detectors lie on any arbitrarily selected straight line. The detectors can be provided on a side face of a housing of the detection and evaluation device. If the device is arranged such that light reflected or scattered by the object propagates non-parallel to the side face of the housing at the side face, such a detector arrangement allows three spatial coordinates of the object to be determined even if a distance between the object and the irradiation position is unknown.

The intensity of the light beam can be modulated such that the light beam has essentially a sequence of light pulses with a predetermined repetition rate. The evaluation circuit can be configured to determine, for each light signal, the associated phase difference between the reference signal and the signal component of the light signal, the signal component having a frequency which is a multiple of the repetition rate.

The intensity of the irradiated sequence of light pulses as a function of time may serve as a reference signal. Because the phase difference is determined based on a signal component, the frequency of which corresponds to a multiple of the fundamental frequency of the sequence of light pulses, the accuracy of position determination can be enhanced for a given phase resolution, as described above.

The detection and evaluation device can be used in the device for measuring a surface according to an embodiment, but may also be used in other areas in which a position of an object, i.e. plural coordinates of the object, is to be determined.

According to another aspect, a method of measuring a surface is provided, in which positions of plural surface areas of the surface are sequentially determined. In order to determine the position of a surface area, a sequence of light pulses having a repetition rate is irradiated onto the surface area and at least one light signal which includes the sequence of light pulses scattered and/or reflected on the surface area is detected. The position of the surface area is determined based on a signal component of the at least one detected light signal, the signal component having a frequency which corresponds to a multiple of the repetition rate. The position of the surface area may in particular be determined based on a phase difference between a reference signal derived from the irradiated sequence of light pulses and the signal component of the at least one detected light signal.

As explained in connection with the device for measuring a surface, this method allows a surface to be measured in a contact-free manner. Because a signal component having a frequency which corresponds to a multiple of the repetition rate is used for determining the phase difference, the accuracy with which the position of the individual surface areas can be determined is enhanced, to thereby enhance the accuracy of the surface measurement.

A plurality of light signals may be detected which correspond to the sequence of light pulses scattered on the surface area into different directions. For each one of the light signals, a phase difference may be determined based on a signal component, the frequency of which corresponds to a multiple of the repetition rate. The number of detected light signals is selected based on the number of unknown coordinates of the surface area as well as further unknown parameters which may possibly be present, such as a distance of the surface area from an irradiation position, such that the coordinates of the surface area may be determined. For example, at least three light signals scattered by the surface area into at least three different directions can be detected. This allows the coordinates of the surface area to be determined even if the irradiation position from which the sequence of light pulses is irradiated onto the surface area is unknown. It is also possible that at least four light signals scattered by the surface area into at least four different directions are detected. This allows a distance between the irradiation position and the surface area to be also determined based on the determined phase differences, in addition to the coordinates of the surface area. The determined distance value may for example be used for enhancing the lateral resolution, by focusing the irradiated sequence of light pulses onto the surface area.

In principle, more phase differences than would actually be required for computing the position of the surface area, for example using trilateration, may be determined. This allows an over-determined equation system to be set up for the position of the surface area, in order to enhance the accuracy of the position determination. In this case, methods may be used which are known, for example, from position determination in the global positioning system (GPS) to determine the position of the surface area from the plurality of distance values.

To measure the surface, the surface is sampled in order to irradiate plural sequences of light pulses onto the plural surface areas. This sampling or scanning of the surface can to a large extent be done automatically, for example by controlling an adjustable optical element. The areas onto which the sequences of light pulses impinge for different positions of the adjustable optical element define the plural surfaces areas, the positions of which are determined. A surface area, the position of which is determined, may also be selected in a generally user-defined manner, for example by the sequence of light pulses being irradiated onto the surface area by means of a hand apparatus.

The signal component can be mixed down to a lower frequency to determine the phase difference of the signal component relative to a reference signal, which may for example be obtained by directing a portion of the sequence of light pulses onto a reference signal detector. This allows the determination of the phase difference to be carried out on a low-frequency signal. For down-conversion, the signal component may be mixed with a reference signal component of the reference signal, the frequency of which is also a multiple of the fundamental frequency of the sequence of light pulses, i.e. a multiple of the repetition rate. The signal component may be subjected to a multi-stage mixing process in order to mix it down to the low frequency.

In order to determine the position of the surface area, for a detected light signal a phase difference may iteratively be determined for plural signal components, with frequencies of the signal components being selected to be higher with increasing iteration count. In this manner, the accuracy of the position determination can be enhanced from iteration to iteration. At least one of the plural signal components has a frequency which corresponds to a multiple of the repetition rate.

For improving a signal-to-noise-ratio, the detection of light signals and/or a further signal processing of the detected light signals may be suppressed in a time interval in which no light pulse can be detected. The time interval is determined based on the repetition rate and minimum and maximum expected signal propagation times. Alternatively or additionally, a concave mirror or a lens may be provided on a detector arrangement for detecting the at least one light signal, for improving the signal level.

The method may be carried out with a device according to an embodiment of the invention.

The devices and methods according to various embodiments of the invention can generally be used to measure surfaces. An exemplary area of application is measuring applications in quantitative quality control, in particular in industrial production. However, the embodiments of the invention are not limited to such applications.

The invention will in the following be explained in more detail based on embodiments with reference to the accompanying drawings.

DETAILED DESCRIPTION OF THE INVENTION

In the following, embodiments of the invention will be explained in more detail. Features of the various embodiments may be combined with each other unless explicitly excluded in the following description. While some embodiments are described with regard to specific applications, for example in the context of an industrial plant, the present invention is not limited to these applications.

Figure 1:
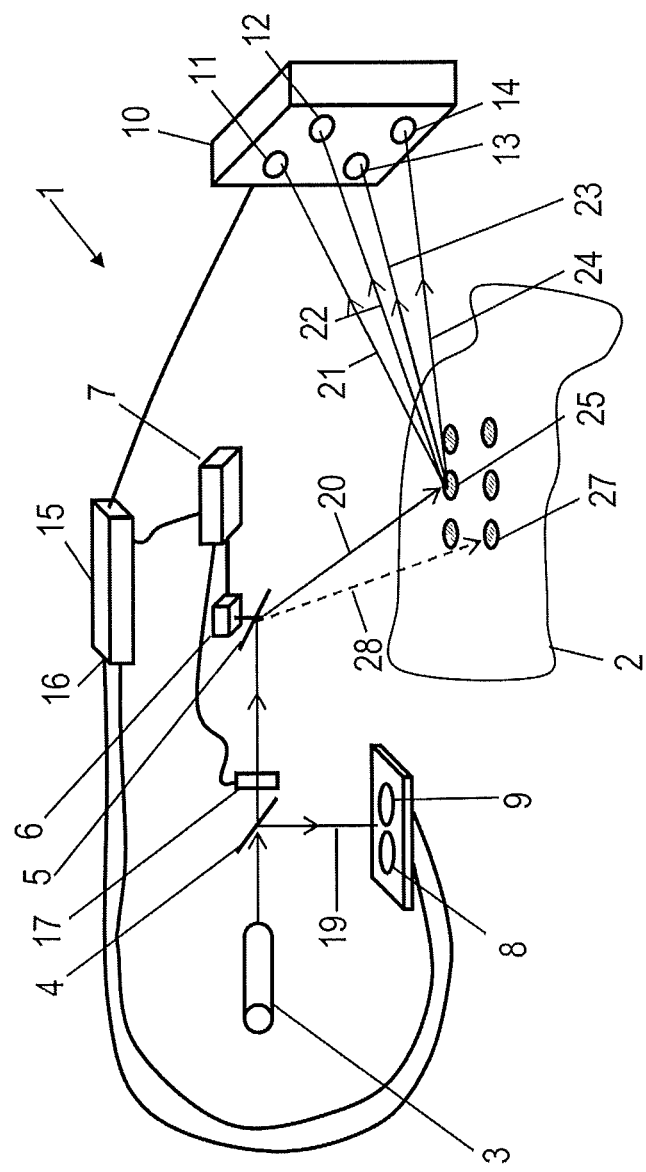
FIG. 1 is a schematic representation of a device according to an embodiment.

FIG. 1 is a schematic representation of a device 1 for measuring a surface 2 according to an embodiment.

The device 1 comprises a light source 3 which generates a sequence of short light pulses with a repetition rate, a light directing device which has an adjustable deflection mirror 5 and an associated adjusting device or actuator 6, a detector arrangement 10 having plural photodetectors 11-14, and an evaluation circuit 15. The sequence of light pulses is irradiated onto the deflection mirror 5 by the light source 3. The sequence of light pulses is directed as a light beam 20 onto a surface area 25 of the surface 2, as a function of the position of the deflection mirror 5. A characteristic dimension of the surface area 25 is in this case determined by the diameter of the light beam 20, i.e. of the sequence of light pulses, upon impingement onto the surface 2. If the light beam 20 is focused onto the surface 2, the diameter of the surface area 25 can, in an ideal case, essentially be diffraction-limited.

The sequence of light pulses is scattered on the surface area 25. The photodetectors 11-14 of the detector arrangement 10 receive light signals 21-24 which respectively include a portion of the sequence of light pulses scattered by the surface area 25. The photodetectors 11-14 detect a received light energy or light intensity, respectively, as a function of time. The evaluation circuit 15 determines for the light signals detected by the photodetectors 11-14 a phase relation relative to the irradiated sequence of light pulses. The phase relation is related to the propagation time of the light pulses from the surface area 25 to the photodetectors 11-14 and, thus, to the distance of the surface area 25 from the detectors. Thereby, the position of the surface area 25 can be determined. As will be explained in more detail below, the determination of the phase relation by the evaluation circuit 15 is based on signal components of the light signals detected at the photodetectors 11-14 which have a frequency that is a multiple of the repetition rate.

The device 1 further comprises two reference signal detectors 8, 9, onto which the sequence of light pulses is directed in a partial beam 19 as a reference signal from a beam splitter 4. For reasons of simplicity, it is said here that the sequence of light pulses is irradiated both in the light beam transmitted from the beam splitter 4 to the deflection mirror 5 and in the partial beam 19 directed from the beam splitter 4 to the reference signal detectors 8, 9, it being understood that respectively only a portion of the light intensity of each light pulse is directed to the reference signal detectors 8, 9 in the partial beam 19 and onto the surface 2 in the partial beam 20, respectively. The reference signal 19 is detected by both reference signal detectors 8, 9 and is provided to the evaluation circuit 15 at a reference signal input 16. If necessary, a beam expander can be arranged in the beam path of the partial beam 19 to ensure that the partial beam 19 is detected by both reference signal detectors 8, 9. As will be explained in more detail, the reference signal which is respectively provided by the reference signal detectors 8, 9 is used by the evaluation circuit 15 to determine the phase relations of the sequence of light pulses scattered by the surface area 25.

The device 1 further comprises a computing unit 7 coupled to the evaluation circuit 15 to determine the position of the surface area 25 based on the determined phase relations.

A determination of the position of the surface area 25 here refers to determining three coordinates of a point of the surface area 25. As the surface area 25 has, in an ideal case, a small dimension which is determined by the diameter of the irradiated light beam, reference will be made to the position of the surface area in a simplifying manner, even though the surface area has a certain small extension.

To reduce the dimension of the surface area 25 and to enhance the lateral resolution in measuring the surface 2, an adjustable focusing optic 17 is provided in the beam path between the beam splitter 4 and the deflection mirror 5. The focusing optic 17 is controlled by the computing unit 7 such that the light beam 20 is focused onto the surface 2, in an ideal case focused in a diffraction-limited manner.

In order to determine the position of the surface area 25, it is not required for the angular position of the deflection mirror 5 in the device 1 to be precisely known because, in the device 1, the position of the surface area 25 is determined based on the light signals 21-24 detected by the photodetectors 11-14 and the reference signal 19 detected by the reference signal detectors 8 and 9. By using a detector arrangement 10 in which a number of photodetectors 11-14 is employed which is greater than the number of coordinates of the surface area 25 to be determined, it is moreover attained that the position determination can be performed in a robust manner even if the precise position of the deflection mirror 5 is not known.

The computing unit 7 is coupled to the actuator 6 of the deflection mirror 5 to adjust the position of the deflection mirror 5 by controlling the actuator 6. By adjusting the deflection mirror 5, the sequence of light pulses can be directed as a light beam 28 onto another surface area 27 in order to determine the position thereof. The deflection mirror 5 may be gimballed to sample the surface 2. By virtue of the robustness of the position determination in the device 1 it is also possible that other, simpler deflection systems are used, for example a pair of mirrors which can be tilted or pivoted about two mutually orthogonal axes. Instead of deflection mirrors, other suitable optical elements may be used to sample the surface, for example a deflection prism or similar.

Because the positions of the various surface areas are determined in a sequential manner, with the position determination being performed in the same way for each one of the surface areas, the position determination will be described in more detail for only one surface area in the following. For measuring the surface, the positions of plural surface areas are respectively determined consecutively in the described manner.

The light source 3 of the device 1 generates an optical signal, the intensity of which is modulated with a periodic function, with the modulation having a fundamental frequency f0 as well as pronounced components of harmonics of the fundamental frequency f0, i.e. pronounced frequency components having frequencies which are multiples of f0. Such a signal is, for example, generated by a short pulse laser, which generates a sequence of light pulses in a well-defined interval $T0=1/f0$, i.e. with a repetition rate f0, with the duration of each pulse being short compared to the time interval T0 between successive pulses.

FIG. 2A shows exemplarily such a sequence of short light pulses 31, wherein the output power P of the light source 3 is shown as a function of time t. The interval T0 between successive pulses is indicated with reference sign 32, while the duration of each light pulse is indicated with reference sign 33. The duration of each light pulse may be very short compared to the interval T0 between successive light pulses, for example on the order of $1 \cdot 10^{-5}$. In the device 3, the repetition rate f0 and the duration of each pulse may be suitably selected in dependence on a desired measurement accuracy for position determination, an initial uncertainty on the position of the surface area, the signal component of the light signal detected at the photodetectors 11-14, for which the phase difference is determined, or based on other factors. If the $n^{th}$ harmonic of f0 is to be used for determining the phase difference, the duration of each light pulse and the interval T0 between successive light pulses are selected such that the sequence of light pulses output by the light source 3 still has a sufficient spectral weight at the frequency n·f0. While a sequence of square pulses is exemplarily shown in FIG. 2A, other suitable pulse shapes may also be chosen, for example a square of a hyperbolic secans or a Gauss function.

FIG. 2B exemplarily shows a frequency spectrum 35 of a sequence of light pulses which is generated with a repetition rate f0, with the duration of each light pulse being short compared to $T0=1/f0$. The frequency spectrum 35 has a number of peaks at a constant frequency spacing f0, which is schematically indicated at reference sign 36. The spectral weight of the individual peaks decreases towards higher frequencies, the decrease rate being determined by the ratio of the time interval between successive light pulses and the light pulse duration. For the light source 3 of the device 1 these values are selected such that the spectral weight of the frequency component 37 having frequency n·f0, which is used for determining phase relations, is sufficiently large in the sequence of light pulses to perform phase measurements.

Figure 2:
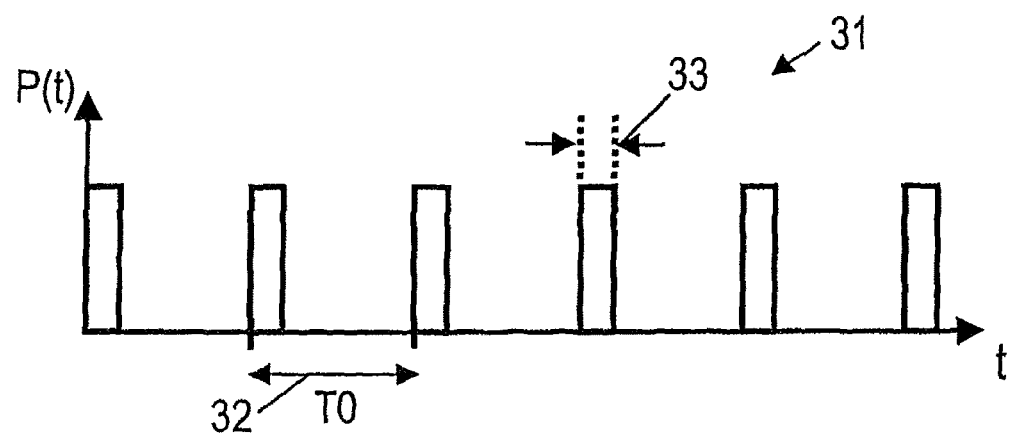
FIG. 2A shows exemplarily a sequence of light pulses as a function of time.
FIG. 2B shows schematically a Fourier spectrum of the sequence of light pulses of FIG. 2A.
Figure 2:
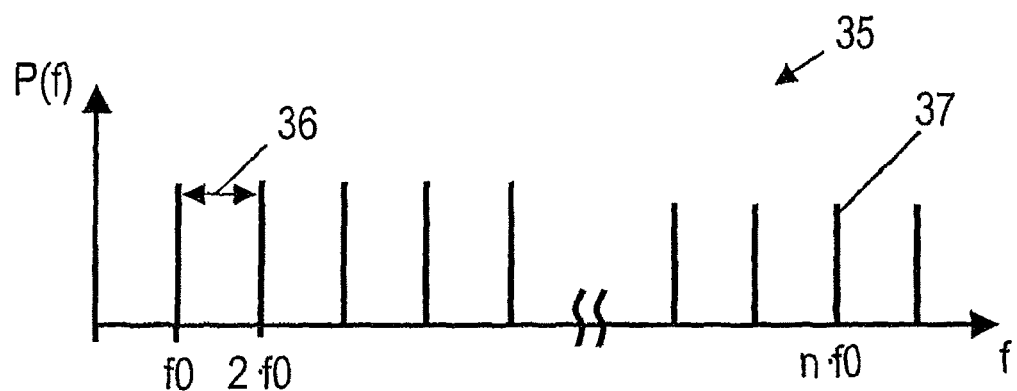

A sequence of light pulses as schematically shown in FIG. 2 can be generated by various lasers which are configured for generating short light pulses. In particular, optical frequency synthesizers may be used. For example, an electrically pumped diode laser, such as a q-switched laser, a gain-switched laser, an active or passive mode-locked laser or a hybrid mode-locked laser, or a mode-locked surface emitting laser having a vertical cavity ("vertical-cavity surface emitting laser", VCSEL) may be used as a light source 3. An optically pumped laser may also be used as light source 3, for example a passive mode-locked surface emitting laser having an external vertical cavity ("vertical external cavity surface emitting lasers", VECSEL) or a laser based on photonic-crystal fibers (photonic-crystal-fiber laser). Exemplary pulse durations of the light source 3 lie in a range from 100 fs to 100 ps. Exemplary repetition rates lie in a range from 50 MHz to 50 GHz. Exemplary mean powers lie in a range from 1 mW to 10 W. Exemplary values for pulse jitter lie between 10 fs and 1 ps effective (square mean).

As shown in FIG. 1, a partial beam of the sequence of light pulses output by the light source 3 is directed via the beam splitter 4 as reference signal 19 to the reference signal detectors 8, 9. If required, an optical element for beam splitting, in particular a beam splitter, can be provided in the beam path from the beam splitter 4 to the reference signal detectors 8, 9 to ensure that the partial beam 19 impinges both onto the reference signal detector 8 and onto the reference signal detector 9. A further partial beam 20 is directed via the deflection mirror 5 onto the surface area 25 of the surface 2. Here it is assumed that the surface area onto which the sequence of light pulses is irradiated has light-scattering properties. The sequence of light pulses is scattered by the surface area 25 into a plurality of spatial directions. The scattered light also includes the sequence of light pulses which is scattered as light signals 21-24 toward the photodetectors 11-14. The photodetectors 11-14 of the detector arrangement 10 are arranged such that none of the photodetectors lies on a straight line which passes through a surface area 25, 27, the position of which is to be determined, and any other one of the photodetectors. For the illustrated arrangement in which the four photodetectors 11-14 are essentially arranged in a plane such that not more than two of the photodetectors 11-14 are located on any arbitrarily selected straight line, this can easily be attained, for example by arranging the detector arrangement 10 spaced from the surface 2 and at an angle different from 0° to all vectors connecting points of the surface and the detector arrangement 10. In this case, the position of the surface area 25 can be determined from the phase relations of the signals detected at the various photodetectors 11-14, because a sufficient number of phase relations which are independent of each other can be determined.

The light signals 21-24 are detected by the photodetectors 11-14. Due to the fact that the light pulses are generated with a well-defined repetition rate, the signal portion which is caused by scattering of the sequence of light pulses on the surface area 25 can be determined in the signal processing by the evaluation circuit 15 by means of a suitable filtering, so that signal portions which are not caused by the light scattered by the surface area 25 towards the photodetectors 11-14 will not be discussed further in the following.

Both the photodetectors 11-14 and the reference signal detectors 8, 9 which are also configured as photodetectors 8, 9 detect a light energy incident thereupon as a function of time. The different optical path lengths of a light pulse to reach one of the reference signal detectors 8, 9 on the one hand and, after scattering on the surface area 25, one of the photodetectors 11-14 on the other hand respectively gives rise to a time shift $\tau_1$, $\tau_2$, $\tau_3$ and $\tau_4$, respectively, between the arrival of one and the same light pulse at one of the detectors 11-14 and at the reference signal detectors 8, 9. The time shift is equal to the difference in optical path lengths of the beam paths divided by the speed of light c. As typically only a small portion of the light 20 irradiated onto the surface 2 is scattered by the surface area 25 towards one of the photodetectors 11-14, the signal at the photodetectors 11-14 is attenuated compared to the reference signal at the reference signal detectors 8, 9.

For each one of the photodetectors 11-14, the difference in path lengths is given by the difference between the optical path length from the beam splitter 4 via the deflection mirror 5 to the surface area 25 and onward to the respective photodetector 11-14 and the optical path length from the beam splitter 4 to the reference signal detectors 8, 9. In this case, the first-mentioned path from the beam splitter 4 via the deflection mirror 5 to the surface area 25 and onward to the respective photodetector 11-14 depends on the position of the surface area 25 which is to be determined, while the distance from the beam splitter 4 to the reference signal detectors 8, 9 is determined by device geometry and is assumed to be known. By measuring the time shifts $\tau_1$, $\tau_2$, $\tau_3$ and $\tau_4$, respectively, between the light signals 21-24 detected at the photodetectors 11-14 and the reference signal 19, which is detected by the reference signal detectors 8, 9, the optical path length traveled by the light pulse between the beam splitter 4 and each one of the photodetectors 11-14 can be determined.

The photodetectors 11-14 as well as the reference signal detectors 8, 9 are coupled to the evaluation circuit 15, which determines a phase difference between the light signals 21-24 and the reference signal 19. As will be explained in more detail in the following, the evaluation circuit 15 of the device 1 determines the phase difference between the light signal 21-24 and the reference signal 19 for a signal component having a frequency which essentially is a multiple of the repetition rate.

As described with reference to FIG. 2 for the sequence of light pulses generated by the light source, the sequence of light pulses received at the photodetectors 11-14 has a plurality of harmonics, the frequencies of which are multiples of the repetition rate f0:

$$f_i = i \cdot f0, \tag{1}$$

with i being a natural number and f0 being the repetition rate of the light source 3. A characteristic value for frequencies which still have a significant spectral weight in a Fourier representation of the light energy received by the photodetectors 11-14 as a function of time is given by the quotient of the interval T0 between successive light pulses and the characteristic duration of a light pulse.

In the following, the signal processing is exemplarily explained in more detail only for the light signal 21 detected by the photodetector 11. The explanations apply correspondingly also to each other light signal 22-24 which propagates from the surface area 25 to the detector arrangement 10.

A time shift $\tau$ between the light signal 21 and the reference signal 19 received at the reference signal detectors 8, 9 results in that a signal component having a frequency of $f_i$ of the signal received at the photodetector 11 has a phase shift relative to a reference signal component having a frequency of $f_i$ of the reference signal 19 received at the reference signal detectors 8, 9, with the phase shift being $$\Delta \phi_i = 2 \cdot \pi \cdot f_i \cdot \tau \tag{2a}$$
$$= 2 \cdot \pi \cdot i \cdot f0 \cdot \tau$$
$$= 2 \cdot \pi \cdot i \cdot f0 \cdot (d/c). \tag{2b}$$

Here, d denotes the path length difference between a light path of a light pulse which propagates from the beam splitter 4 via the deflection mirror 5 and the surface area 25 to the photodetector 11, and a light path of a light pulse which is directed from the beam splitter 4 to the reference signal detectors 8, 9. Here, it is assumed that the length of the light path of a light pulse which is directed from the beam splitter 4 to the reference signal detectors 8,9 is known, as it is dependent on the geometry of the device only.

If an estimation value dS for the path length difference d is already known which approximates the latter with an accuracy of $c/(i \cdot f0)$, so that $$|d - dS| < c/f_i = c/(i \cdot f0), \tag{3}$$

the part of the phase difference on the right-hand side of Equation (2a) can be determined which is an integer multiple of $2\cdot\pi$ based on dS. Based on dS, an integer number m is determined, so that $$d = d' + m \cdot c/f_i, \text{ wherein } |d'| < c/f_i. \tag{4}$$

Consequently, $$\Delta\phi_i' = \Delta\phi_i - 2\cdot\pi\cdot m \quad (5)$$
$$= 2\cdot\pi\cdot i\cdot f0\cdot(d'/c)$$

is a value lying within the interval from 0 to $2\pi$ which can be determined by measuring the phase relation between an output signal of the photodetector 11 and an output signal of one of the reference signal detectors 8, 9. The quantity d' which can then be determined according to $$d' = c\cdot\Delta\phi'/(2\cdot\pi i\cdot f0) \quad (6)$$

leads to an improved value for the path length difference d in accordance with Equation (4). With the two quantities $\Delta\phi_i'$ and $\Delta\phi_i$ differing only by an integer multiple of $2\cdot\pi$ which is irrelevant for determining the phase difference, both quantities will be referred to as phase difference in the following and no distinction will be made between them.

A value i>1, and typically i>>1, is selected in the device and the method according to embodiments of the invention to determine the phase difference. Therefore, for a given measurement accuracy for a phase difference, which will be referred to as phase resolution in the following, the measurement accuracy for the path length difference and thus the axial resolution can be enhanced.

For illustration, assume that the phase resolution is $2\cdot\pi/1000$ and that f0=100 MHz. Then, the axial resolution is 3 mm/i and becomes smaller with increasing frequency of the signal component, i. For example, an axial resolution of approximately 4.1 µm is reached for i=700. Therefore, the axial resolution can be enhanced by determining the phase difference based on a signal component of the light signal 23 which corresponds to a high-frequency harmonic of the sequence of light pulses, i.e. having a frequency which is the repetition rate multiplied by a factor i>>1. The signal component, based on which the phase difference is determined, is selected such that it has a frequency which is as high as possible and at which the sequence of light pulses still has sufficient spectral weight, and which allows a signal processing by the components of the evaluation circuit 15 configured as a high-frequency circuit.

The evaluation circuit 15 may determine the phase difference by mixing several harmonics with each other. By suitably selecting the harmonics and by mixing a signal component of the light signal received at the photodetector 11 with a reference signal component of a reference signal received by the reference signal detectors 8, 9, a mixing product can be generated which has a relatively low frequency, but includes the phase difference of the harmonic. Thereby, it becomes possible to perform a phase measurement at low frequencies instead of the original requirement to measure short propagation times.

Figure 3:
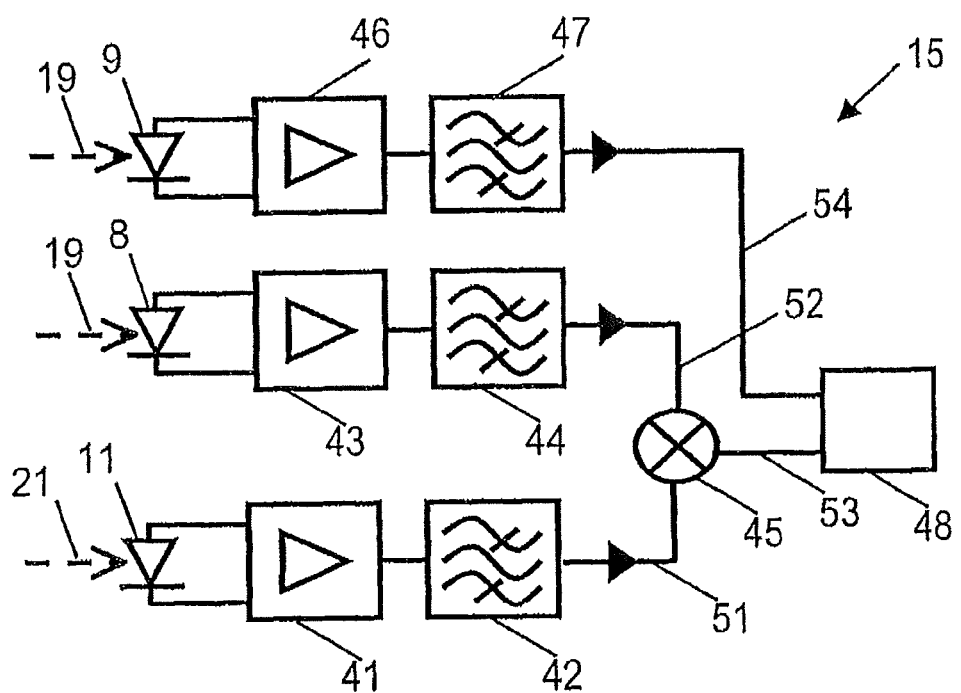
FIG. 3 is a schematic block circuit diagram of a detector arrangement and evaluation circuit which may be used in the device of FIG. 1.

FIG. 3 shows a schematic block circuit diagram of a detector arrangement and evaluation circuit according to an embodiment. The evaluation circuit 15 of the device 1 of FIG. 1 can be configured as shown in FIG. 3.

While only the processing of the light signal from the photodetector 11 is explained with reference to FIG. 3, the signals of plural photodetectors 11-14 can be processed correspondingly, with a correspondingly greater number of signal processing paths being provided. The photodetector 11 and the reference signal detectors 8, 9 are also shown in FIG. 3 for illustration.

The evaluation circuit 15 comprises a signal processing path for an electrical signal output by the photodetector 11, which represents the light signal detected by the photodetector 11, the processing path having an input-side amplifier 41 and a band pass filter 42. The evaluation circuit 15 further comprises a signal processing path for an electrical signal output by the first reference signal detector 8, which represents the reference signal detected by the first reference signal detector 8, the processing path having an input-side amplifier 43 and a band pass filter 44, and a signal processing path for an electrical signal output by the second reference signal detector 9, which represents the reference signal detected by the second reference signal detector 9, the processing path having an input-side amplifier 46 and a band pass filter 47. As the signals output by the detectors and by the reference signal detectors, respectively, represent the optical signals incident thereupon and are indicative of the light intensity as a function of time, the signals output by the detectors and reference signal detectors, respectively, are referred to in the same way as the detected optical signals, i.e. as detected "light signal" and "reference signal", respectively, with the signals processed by the evaluation circuit being electrical signals.

The band pass filter 42 is configured such that a signal component of the light signal detected by the photodetector 11 which has a frequency of n·f0 is allowed to pass, with n being a natural number greater than 1. As described above, n is advantageously selected to be as large as possible to enhance the axial resolution. Advantageously, the band pass filter 42 has a pass band which is selected such that the transmission of signal components having frequencies of (n+1)·f0 and (n−1)·f0 is significantly damped as compared to transmission of the signal component having the frequency n·f0. To this end, the band pass filter 42 may have a pass band having a width smaller than f0.

The band pass filter 44 is configured such that a reference signal component of the reference signal detected by the first reference signal detector 8 which has a frequency of k·f0 is allowed to pass, with k being a natural number. For example, k=n−1 may be selected, such that the band pass filter 44 allows a reference signal component having the frequency (n−1)·f0 to pass. Advantageously, the band pass filter 44 has a pass band which is selected such that the transmission of reference signal components having frequencies of (k+1)·f0 and (k−1)·f0 is considerably damped compared to transmission of the reference signal component having the frequency k·f0. To this end, the band pass filter 44 may have a pass band having a width smaller than f0.

A mixer 45 is coupled, at an input side, to the band pass filters 42 and 44 to receive the signal component 51 of the light signal and the reference signal component 52 of the reference signal. The result of frequency mixing, $$\cos(n\cdot f0\cdot t+\Delta\phi_n)\cdot\cos((n-1)\cdot f0\cdot t)=[\cos(f0\cdot t+\Delta\phi_n)+\cos((2\cdot n-1)\cdot f0\cdot t+\Delta\phi_n)]/2 \quad (7)$$

has a low-frequency component having frequency f0, which corresponds to the fundamental frequency of the signal generated by the light source 3, and a high-frequency component.

Although the first term on the right-hand side of Equation (7) has the fundamental frequency f0, the phase $\Delta\phi_n$ in the argument of the low-frequency component in Equation (7) is given by Equation (2), i.e., it corresponds to the phase difference for the signal component of the light signal having frequency n·f0. The low-frequency component is provided as a signal 53 to a phase evaluator 48, the second input of which is coupled to the band pass filter 47.

The band pass filter 47 is configured such that a reference signal component of the reference signal detected by the second reference signal detector 9 which has a frequency of f0 is allowed to pass. Advantageously, the band pass filter 47 has a pass band which is selected such that transmission of reference signal components having frequencies of 0·f0 and 2·f0 is considerably damped compared to the transmission of the reference signal component having frequency f0. To this end, the band pass filter 47 may have a pass band having a width smaller than f0. The resulting reference signal component having frequency f0 is provided to the phase evaluator 48 as a signal 54.

The phase evaluator 48 determines the phase difference $\Delta\phi_n$ between the signal 53 and the signal 54. Because the phase difference $\Delta\phi_n$ is transferred onto a signal having a frequency of f0 by the conversion, the phase measurement can be made at low frequencies.

The amplifiers 43 and 46 in the signal processing paths for the reference signal detectors 8, 9 can be specifically selected because the signal 54 is directly captured optically with the aid of the second reference signal detector 9 rather than being generated from the signal captured by the first reference signal detector 8. For example, the amplifier 46 can be selected such that it has a good performance characteristic at frequency f0, while the amplifier 43 can be selected such that it has a good performance characteristic at frequency (n−1)·f0.

Figure 4:
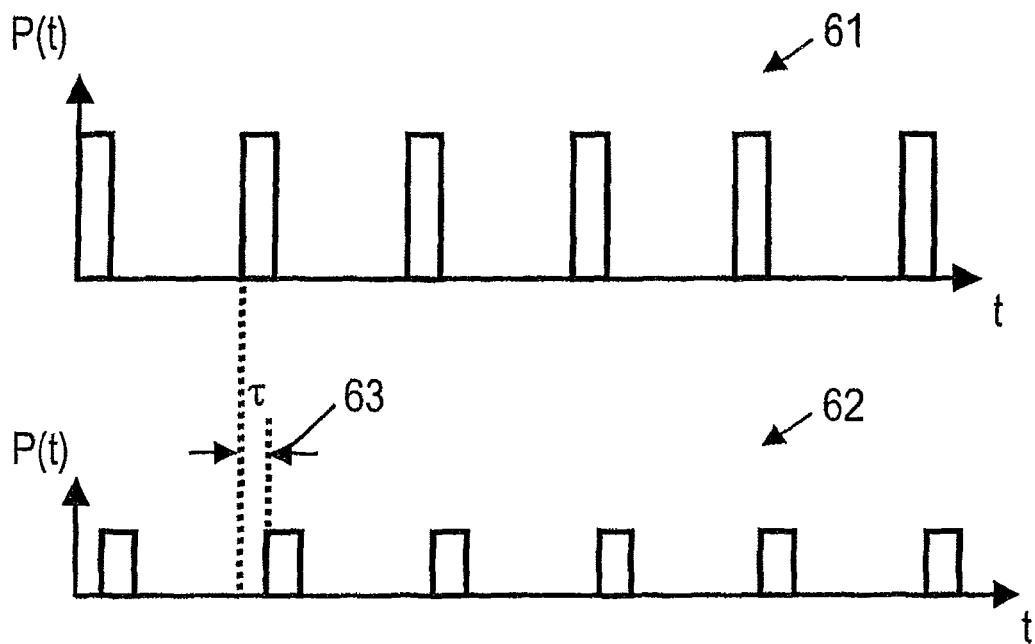
FIGS. 4A and 4B show exemplary signals which occur in the evaluation circuit of FIG. 3.
Figure 4:
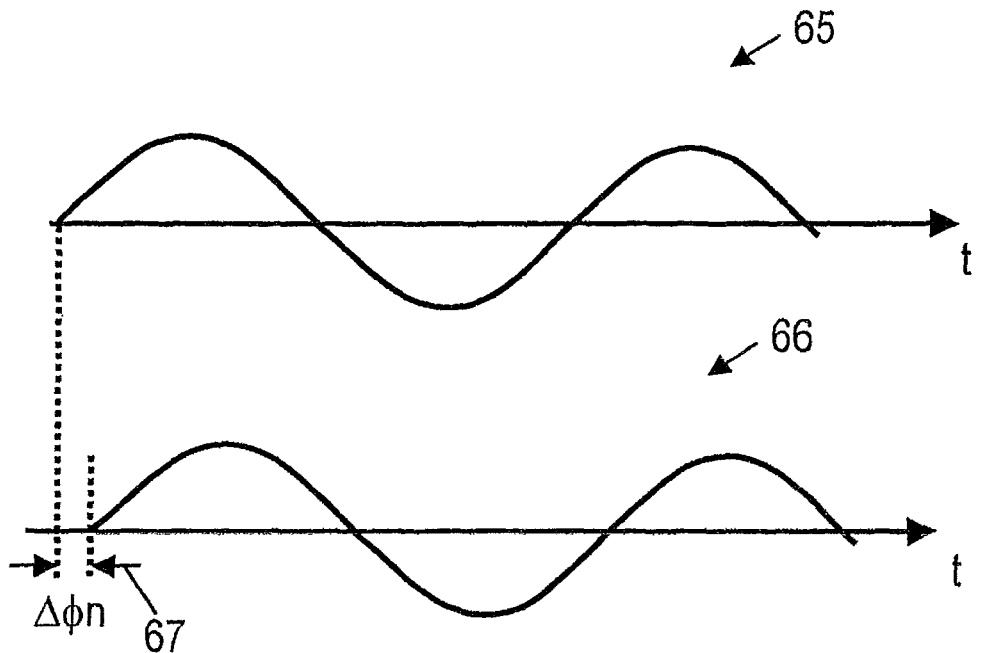

FIG. 4 illustrates various signals which occur in the detection and evaluation device of FIG. 3.

FIG. 4A shows an exemplary reference signal 61 and an exemplary light signal 62, with the light energy received by the photodetector 11 being represented as a function of time. The light signal 62 at the photodetector 11 has a time shift τ indicated at 63 relative to the reference signal 61.

FIG. 4B shows exemplary signals as they may typically occur at the inputs of the phase evaluator 48. At 65, the fundamental oscillation having frequency f0, which is derived from the reference signal, is represented as a function of time, while the signal generated by down-conversion of the signal component of the light signal detected by the photodetector 11 to frequency f0 is shown at 66, which latter signal also has frequency f0 but is phase-shifted by the phase $\Delta\phi_n$ relative to the fundamental oscillation derived from the reference signal. The phase difference $\Delta\phi_n$ is determined by the phase evaluator 48 in a suitable manner, for example by analog-digital conversion of the signals and subsequent fitting of the phase difference.

Figure 5:
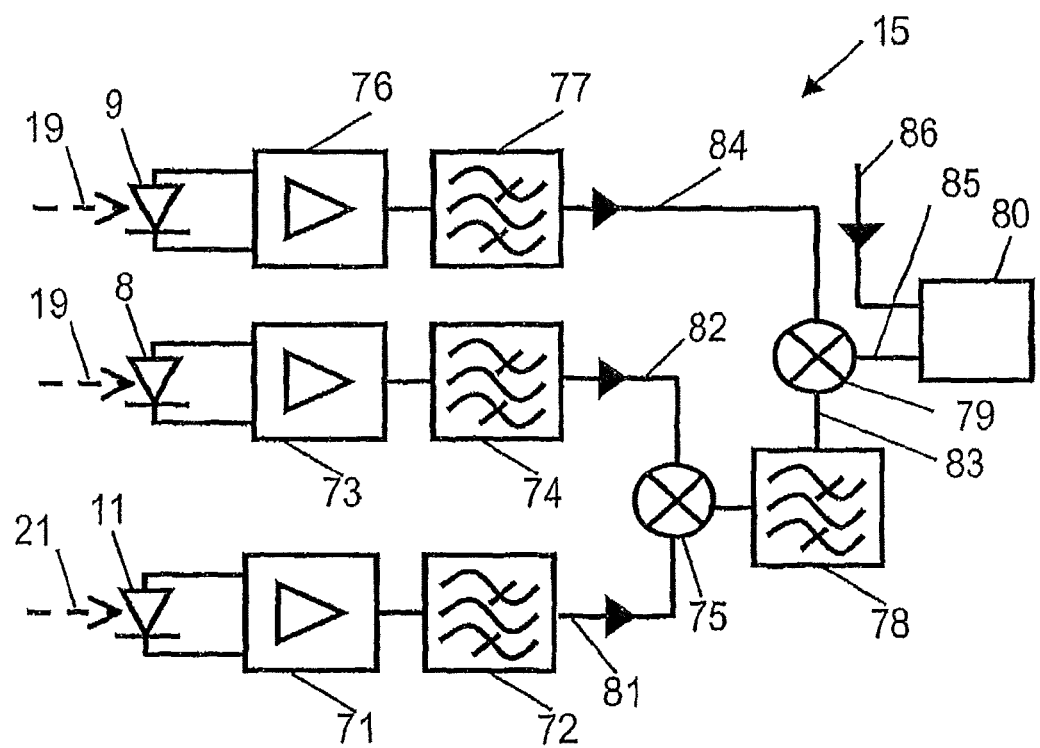
FIG. 5 is a schematic block circuit diagram of another detector arrangement and evaluation circuit which may be used in the device of FIG. 1.

FIG. 5 shows a schematic block circuit diagram of another detector arrangement and evaluation circuit. The evaluation circuit 15 of the device 1 of FIG. 1 may be configured as shown in FIG. 5.

While only the processing of the light signal from the photodetector 11 is explained with reference to FIG. 5, the signals of plural photodetectors may be processed in a corresponding manner, with a correspondingly greater number of signal processing paths being provided. The photodetector 11 and the reference signal detectors 8, 9 are also shown in FIG. 5 for illustration.

The evaluation circuit 15 has input amplifiers 71, 73, 76 in signal processing paths which are associated with the photodetector 11 and the reference signal detectors 8 and 9. Each one of the signal processing paths further has a band pass filter 72, 74 and 77, respectively.

The band pass filter 72 is configured such that a signal component of the light signal detected by the photodetector 11 having a frequency of n·f0 is allowed to pass, with n being a natural number greater than 1. As described above, n is advantageously selected to be as large as possible to enhance the axial resolution. The band pass filter 74 is configured such that a reference signal component of the reference signal detected by the first reference signal detector 8 which has a frequency of k·f0 is allowed to pass, with k being a natural number which is selected such that |n−k|>1. The band pass filter 77 is configured such that a reference signal component of the reference signal detected by the second reference signal detector 9 which has a frequency of (|n−k|−1)·f0 or of (|n−k|+1)·f0 is allowed to pass.

The signal component 81 and the reference signal component 82, respectively, which are transmitted through the band pass filter 72 and 74, respectively, are mixed by a mixer 75. If each one of the band pass filters 72 and 74 has a pass band which is sufficiently narrow having a width of less than f0, the resulting signal includes a component having a frequency of |n−k|·f0 and another higher-frequency component having a frequency of (n+k)·f0, which is removed by a band pass filter 78 arranged downstream of the mixer 75. By means of the mixer 75, the phase difference $\Delta\phi_n$ of the light signal detected by the photodetector 11 is thus transferred into an intermediate frequency range at the frequency |n−k|·f0. The signal 83 converted into the intermediate frequency range is provided to a further mixer 79, the second input of which receives a signal 84 from the band pass filter 77, the signal 84 being the reference signal component having a frequency of (|n−k|−1)·f0, for example, of the reference signal. By mixing the signals 83 and 84, a signal 85 is generated which has a component oscillating with the fundamental frequency f0 and having a phase shift of $\Delta\phi_n$, similarly to what has been explained with reference to Equation (7) above. A high-frequency component which is also generated by the mixer 85 can be removed by a further filter, if necessary.

If, as shown in FIG. 5, the signal component of the light signal detected by the photodetector 11 is first down-converted to an intermediate frequency, it is not required for the band pass filters 72, 74 to have a pass band in which only one multiple of the fundamental frequency f0 lies. An intermediate signal which has a component with a frequency of |n−k|·f0 and essentially with a phase shift of approximately $\Delta\phi_n$ is generated by the mixer 75 even if the band pass filter 72 and/or the band pass filter 74 respectively allow plural multiples of the fundamental frequency f0, i.e. a portion of the frequency comb rather than one single harmonic only, to pass. Because the phase relation of the signal components of the light signal detected by the photodetector 11 which have the frequency H0 increases linearly with i in accordance with Equation (5), the band pass filter 72 is preferably configured such that the number of harmonics in the pass band of the band pass filter 72 is small compared to n, so that the variation of the phase relation with the frequency in the pass band remains negligible.

The band pass filters 72 and 74 are advantageously configured such that their pass bands do not overlap. In this case, the phase shift $\Delta\phi_n$ can be determined from the component of the intermediate signal output by the mixer 75, which component has a frequency of |n−k|·f0, even if the frequency characteristics of the band pass filters 72 and 74 and, thus, the spectral weight of the individual harmonics in the signals 81 and 82 is not known.

For example, if f0=100 MHz, n=700 and k=600, and if further the pass band of the band pass filter 72 covers the frequency interval from 69.9 GHz to 70.1 GHz, so that signal components of the light signal detected by the photodetector 11 and having frequencies of 69.9 GHz, 70.0 GHz and 70.1 GHz are allowed to pass, and if the pass band of the band pass filter 74 covers the frequency interval from 59.9 GHz to 60.1 GHz, so that signal components of the reference signal detected by the first reference signal detector 8 and having frequencies of 59.9 GHz, 60.0 GHz and 60.1 GHz are allowed to pass, the intermediate signal output by the mixer 75 has a component having a frequency of |n−k|·f0 and a phase shift of essentially $\Delta\phi_n$.

The requirements imposed on the widths of the pass bands of the band pass filters 72, 74, which lies at higher frequencies than the pass bands of the band pass filters 77 and 78, are thus less strict if the signal component having frequency n·f0 of the light signal detected by the photodetector 11 is down-converted in plural stages, because the pass band of the band pass filters is allowed to transmit plural harmonics i·f0. The pass band of the band pass filters 77 and 78 lies at lower frequencies, at 10.0 GHz for the band pass filter 78 and at 9.9 GHz for the band pass filter 77 in the above example in which f0=100 MHz, n=700 and k=600, so that it is easier to configure these band pass filters 77, 78 such that they have a narrow pass band than the band pass filters 72, 74 having a pass band at higher frequencies of 60 or 70 GHz, for example.

The further mixer 79 is coupled, at an output side, to a phase evaluator 80, the second input of which receives a signal 86 oscillating with the fundamental frequency f0. The signal 86 may be provided by a sync output of the light source 3, for example. Alternatively, the signal 86 may also be generated by selecting the reference signal component having frequency f0 from the reference signal detected by a reference signal detector, as illustrated in FIG. 3.

As explained with reference to FIG. 1-5, in the device 1 of FIG. 1 the path length from the beam splitter 4 via the deflection mirror 5 and the surface area 25 to the respective photodetectors 11-14 can be determined in accordance with Equations (4) and (6) using the phase shifts of harmonic waves of the light signals 21-24. The position of the surface area can be determined from these four path lengths and the known positions of the photodetectors 11-14.

Figure 6:
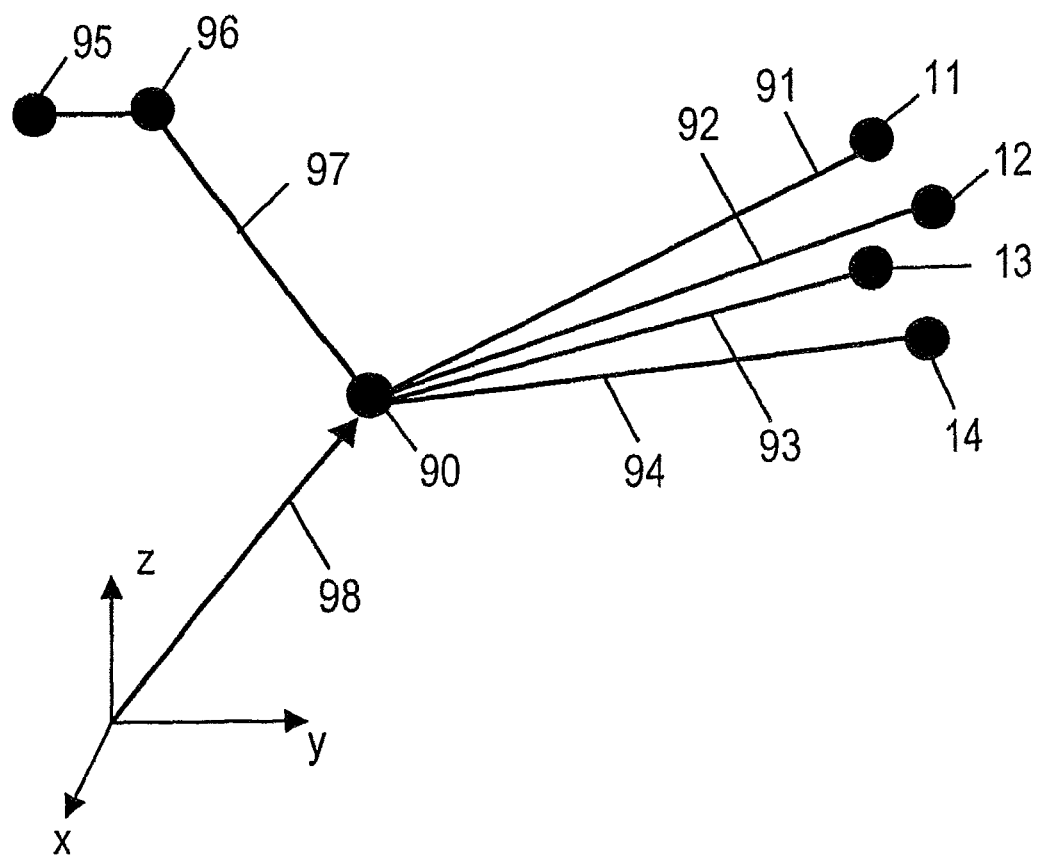
FIG. 6 illustrates determination of a position in the device of FIG. 1.

FIG. 6 illustrates determining the position of a surface area which is schematically shown as a point 90 in a three-dimensional space.

Each one of the four path lengths determined based on the signals from the photodetectors 11-14 corresponds to the sum of a distance 91-94 between the position 90 of the surface area and the respective photodetector 11-14, and the path length 97 from the beam passage point 95 of the beam splitter 4 via the point 96 of beam incidence of the deflection mirror 5 to the position 90 of the surface area. When the four path lengths determined in accordance with Equations (4) and (6) based on the light signals 21-24 of the photodetectors 11-14 are designated by $d_1$, $d_2$, $d_3$ and $d_4$, and when the path length 97 is designated by $r_0$, then $$d_1 = r_0 + |\vec{x}_1 - \vec{x}_{OF}|, \quad (8)$$

$$d_2 = r_0 + |\vec{x}_2 - \vec{x}_{OF}|, \quad (9)$$

$$d_3 = r_0 + |\vec{x}_3 - \vec{x}_{OF}|, \quad (10)$$

$$d_4 = r_0 + |\vec{x}_4 - \vec{x}_{OF}|, \quad (11)$$

On the right-hand side of Equations (8) to (11), $\vec{x}_j$ with j=1, 2, 3, 4 denotes the position vector of the photodetectors 11-14 which is assumed to be known, and $\vec{x}_{OF}$ denotes the position vector 98 of the position 90 of the surface area, which is to be determined. By solving the system of equations defined by Equations (8) to (11), the three components of the position vector 98 and thus the position of the surface area 90 can be determined. In the device 1 of FIG. 1, the system of equations (8) to (11) may be solved numerically by the computing unit 7 to determine the position of the surface area 90.

Because the origin of the coordinate system may be selected in an arbitrary manner, the position of one photodetector, for example of the photodetector 11, may be defined as origin. The vectors $\vec{x}_j$ with j=2, 3, 4 then are the relative positions of the other photodetectors 12, 13, 14 relative to the photodetector 11.

Further, the path length $r_0$ traveled by the light pulses from the beam splitter 4 to the surface area 25 can be determined from the set of equations (8) to (11). Based on the thus determined value for the path length $r_0$, the computing unit 7 may control the focusing optic 17 such that the light beam 2 directed onto the surface 2 is focused onto the surface area 25. The determining the position may then be repeated for the narrowed surface area to enhance a lateral resolution in measuring the surface.

A detector arrangement having more than four photodetectors may also be used. By using additional photodetectors, the accuracy of the position determination for the surface area may be enhanced. To this end, techniques can be employed as used in the global positioning system (GPS) when a position is to be determined with the aid of an over-determined system of equations. Using a detector arrangement having more than three photodetectors may also be advantageous for non-cooperative surfaces, which for example have small scattering cones and/or if shadowing in the spatial region is expected.

While a separate computing unit 7 for determining the position of the surface area is provided in the device 1 of FIG. 1, the computing unit 7 and the evaluation circuit 15 may also be combined into one apparatus.

In the device described with reference to FIG. 1-6, the detector arrangement having the photodetectors 11-14 is combined into one module. The photodetectors may, however, also be combined into plural modules.

Figure 7:
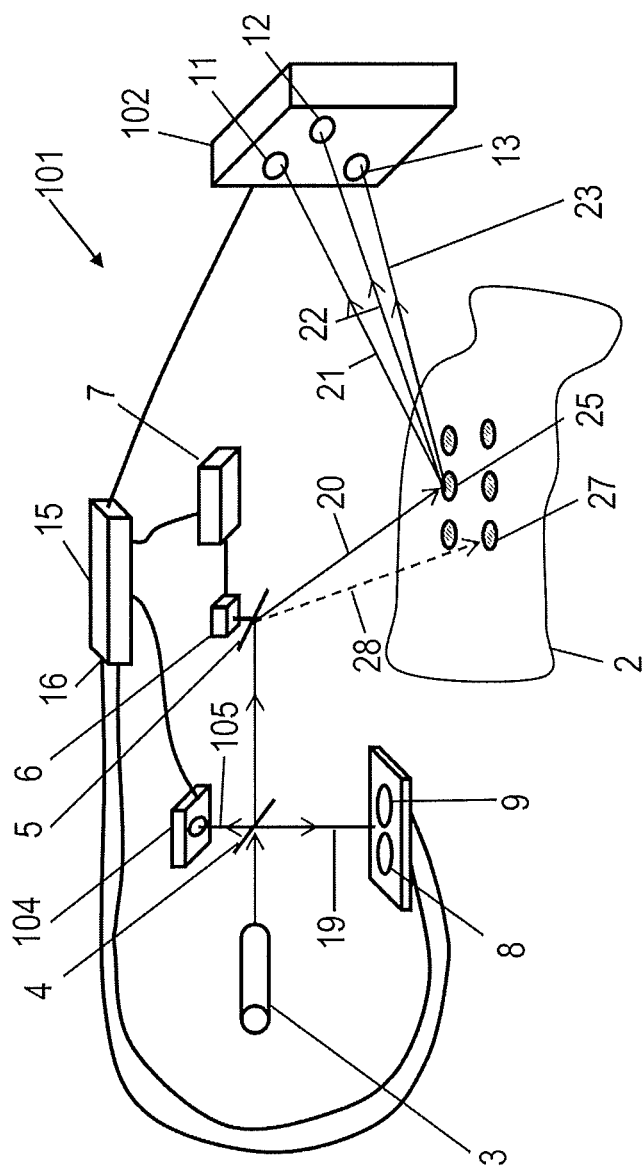
FIG. 7 is a schematic representation of the device according to another embodiment.

FIG. 7 shows a device 101 for measuring a surface according to another embodiment. In FIG. 7, components which are identical to and have the same operation as components described with reference to FIG. 1 are designated with the same reference numeral. Only the differences between the device 101 and the device 1 will be explained in more detail in the following.

In the device 101, a first module 102 having three photodetectors 11-13 and another photodetector 104 separate therefrom are provided to detect the sequence of light pulses scattered by the surface area 25. The photodetector 104 is arranged such that it receives scattered light 105 from the surface area 25 which is scattered or reflected by the surface area 25 towards the deflection mirror 5 and is directed onto the photodetector 104 via the deflection mirror 5 and the beam splitter 4.

In the device 101, four path lengths for light pulses can be determined which correspond to the propagation paths of the light pulses to the photodetectors 11-13 and 104, respectively starting at the beam splitter 4. The path lengths may be determined in the same manner as described for the device 1 with reference to FIG. 1-6, based on signal components of the light signals detected at the photodetectors 11-13 and 104 with the aid of the phase difference of the signal components to a reference signal component.

Figure 8:
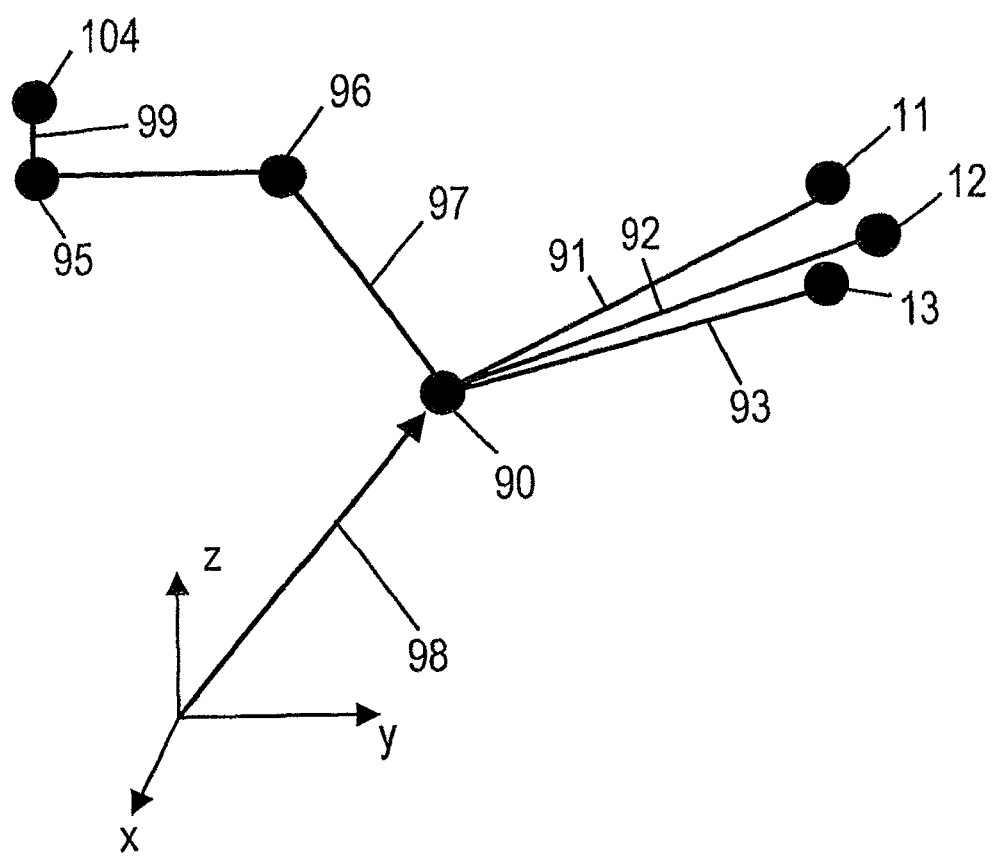
FIG. 8 illustrates a determination of a position in the device of FIG. 7.

FIG. 8 illustrates the determination of the position of a surface area which is schematically illustrated as a point 90 in a three-dimensional space, for the device of FIG. 7. In FIG. 8, the same reference numerals as in FIG. 6 are used for line segments, position vectors and positions.

The path length for light pulses which are detected by the photodetectors 11-13 is given by the path length form the beam passage point 95 of the beam splitter 4 via the point 96 of beam incidence of the deflection mirror 5 to the position 90 of the surface area plus the distance 91-93 of the respective photodetector 11-13 from the position 90 of the surface area, as indicated in equations (8) to (10).

The path length for light pulses which are detected by the photodetector 104 is given by twice the path length from the beam passage point 95 of the beam splitter 4 via the point 96 of beam incidence of the deflection mirror 5 to the position 90 of the surface area plus a distance 99 between the beam passage point 95 of the beam splitter 4 and the photodetector 104, $$d_4 = 2 \cdot r_0 + r_S, \quad (11)$$

with $r_S$ designating the distance between the beam passage point 95 of the beam splitter 4 and the photodetector 104, which is determined by the geometry of the device and can be assumed to be known.

For a known $r_S$, $r_0$ can be directly determined from Equation (11). The three coordinates of the position of the surface area can then be computed from Equations (8) to (10).

The devices and methods according to various embodiments do not require the position from which the sequence of light pulses is irradiated onto the surface to be precisely known, because a sufficient number of detectors is provided to eliminate unknown path lengths when determining the position of the surface area. The devices and methods are therefore robust against larger variations in the position of optical components which are used for irradiating the sequence of light pulses onto the surface. This allows more cost effective components to be used for scanning the surface. For example, a pair of separately tiltable or rotatable mirrors may be used instead of a gimballed deflection mirror.

Devices and methods according to embodiments of the invention can be used in combination with numerous scanning techniques, in which the surface to be measured is sampled, as will be described in more detail with reference to FIGS. 9 and 10 in the following.

Figure 9:
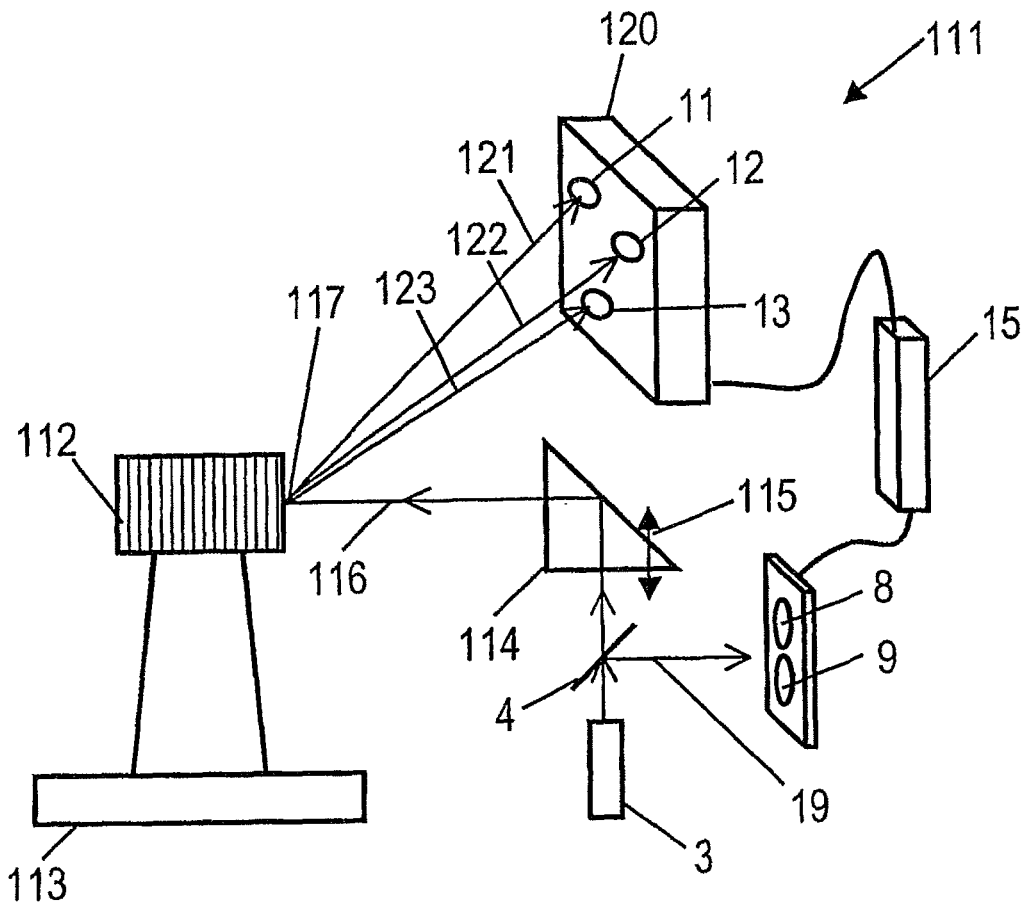
FIG. 9 is a schematic representation of a device according to another embodiment.

FIG. 9 shows a device 111 for measuring a surface according to another embodiment. In FIG. 9, components which are identical to and have the same operation as components explained with reference to FIG. 1 are designated with the same reference numeral. Only the differences between the device 111 and the device 1 will be explained in more detail in the following.

The device 111 has a rotary table 113 on which an object is positioned, the surface 112 of which is to be measured. The rotary table 113 is provided with an angle sensor to detect a rotary position of the rotary table 113.

In the device 111, the surface 112 is measured by a combination of optical techniques and additional sensors. In particular, the complete surface 112 can be measured by means of the optical measurements in combination with the rotary position of the rotary table 113 determined by the angle sensor.

Light output by the light source 3 is directed via a 90° deflection prism onto the surface 112 as an intensity-modulated light beam 116. The position of the deflection prism 114 can be altered in one spatial direction, as indicated at 115. A surface area 117 of the surface 112 onto which the sequence of light pulses is irradiated can be scanned across the surface 112 by displacing the deflection prism 114 and by rotating the rotary table 113. In this case, the plane in which light is irradiated onto the surface 116 is stationary.

The device 111 has a detector arrangement 120 having three photodetectors 11-13. The sequence of light pulses is scattered towards the photodetectors 11-13 from the surface area 117 as scattered light. The photodetectors 11-13 detect the light signals 121-123. The evaluation circuit 15 determines a phase difference between signal components of the light signals 121-123 detected by the photodetectors 11-13 and the reference signal detected by the reference signal detectors 8, 9, wherein the phase difference is determined at a harmonic of the sequence of laser pulses.

The position of the surface area 117 can again be determined from the three determined phase differences and the associated differences in path lengths of the light pulses. With the plane of incidence of the light beam 116 being predetermined, it is only required to determine the coordinates in the plane of incidence. This is possible even when the vertical position of the deflection prism 114 and the distance of the beam splitter 4 from the deflection prism are not exactly known, because three photodetectors 11-13 are provided. Based on the three phase differences which are associated with the light signals 121-123, the path length of the light from the beam splitter 4 to the surface area 117 can also be determined in addition to the position of the surface area 117 in the plane of incidence of the light beam 116.

Figure 10:
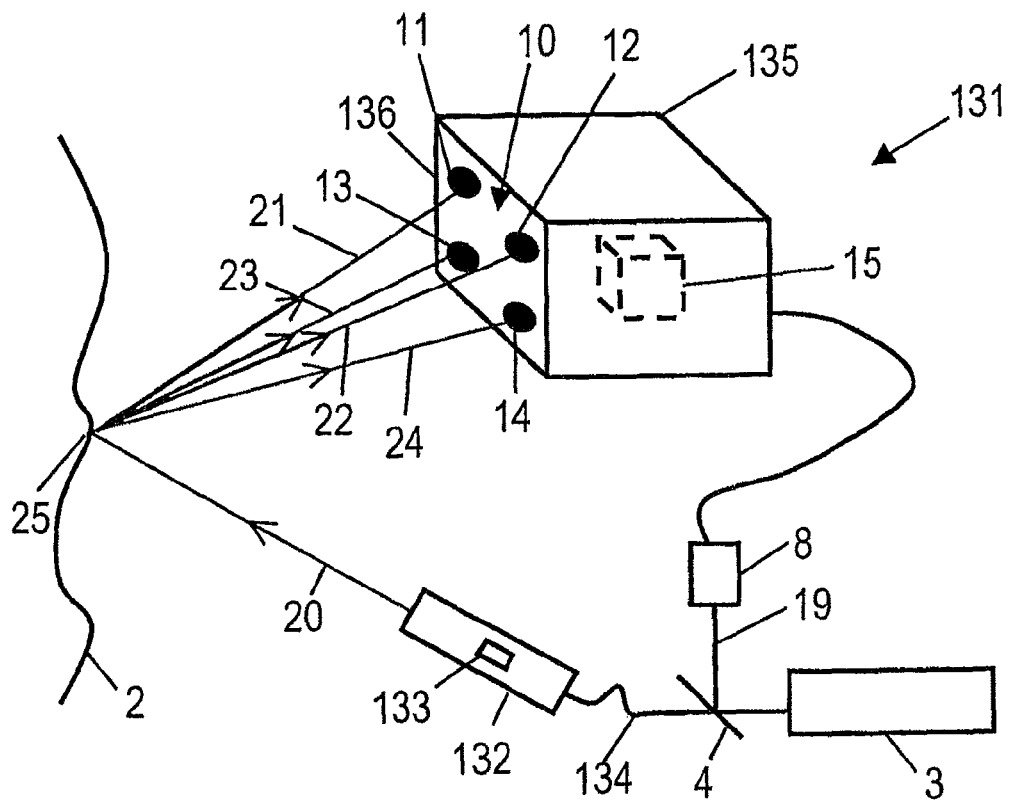
FIG. 10 is a schematic representation of a device according to another embodiment.

FIG. 10 shows a device 131 for measuring a surface according to another embodiment. Components which are identical to and have the same operation as components explained with reference to FIG. 1 are designated the same reference numeral in FIG. 10. Only the differences between the device 131 and the device 1 will be explained in more detail in the following.

The device 131 comprises a light source 3 which outputs a sequence of light pulses to a beam splitter 4. A portion of the sequence of light pulses is guided from the beam splitter 4 as a reference signal to a reference signal detector 8 which outputs the detected reference signal to a combined detection and evaluation apparatus 135.

In the device 131, the light directing device is formed as a hand apparatus 132. Outputting the sequence of light pulses from the hand apparatus 132 is controlled by means of a switch 133 on the hand apparatus 132. The sequence of light pulses is guided to the hand apparatus 132 via an optical fibre 134, such as a glass fibre, and exits from an end face of the hand apparatus 132 in a light beam 20. The hand apparatus is freely moveable in all directions, such that the sequence of light pulses can be irradiated in the light beam 20 onto an arbitrary surface area 25 of the surface 2 to be measured.

A detection and evaluation apparatus 135 is provided for detecting and evaluating light signals 21-24 which are scattered from the surface area 25 and which include the scattered sequence of light pulses. A detector arrangement 10 having four photodetectors 11-14 is provided on a side face 136 of the detection and evaluation apparatus 135. The photodetectors 11-14 are arranged such that at maximum two of the four photodetectors 11-14 are arranged on any arbitrarily selected straight line. The processing of the light signals detected by the photodetectors 11-13 is made by an evaluation circuit 15 integrated into the detection and evaluation apparatus 135 based on phase differences which are determined for signal components of the light signals 21-24, the signal components having a frequency which is a multiple of the fundamental frequency f0.

The position of the surface area 25 may be determined even if the position of the hand apparatus 132 is unknown, because four photodetectors 11-14 are provided on the detection and evaluation apparatus 135. In particular, the unknown parameter which corresponds to the phase of the signal upon impingement onto the surface area 25 can be eliminated when determining the three coordinates of the surface area 25.

In contrast to conventional hand apparatuses which are used for optical distance measurements, all three coordinates of the surface area which is irradiated can be determined with the device 131, rather than only a distance between the hand apparatus and the surface area.

The surface 2 can be measured by passing the light beam 20 over plural surface areas using the hand apparatus 132. Naturally, the hand apparatus 132 may not only be actuated by a human operator, but may also be employed for example if a surface is to be sampled with the aid of a robot.

In the devices and methods described with reference to FIG. 1-10 above, light signals are detected by the photodetectors which are scattered by a surface area. The signal level may be low, at least for larger distances between the detector arrangement and the surface. Moreover, useful signals which are short pulses impinge onto the photodetectors 11-14 and the reference signal detectors 8, 9. The pulse duration may for example be 100 fs. The time interval T0 between successive pulses is given by the reciprocal of the repetition rate. For example, for f0=100 MHz, T0 is 10 ns. For the mentioned exemplary values, a useful signal arrives at the photodetectors 11-14 and the reference signal detectors 8, 9 only in a time interval, the length of which is 100 fs/10 ns=$1/10^5$ of the interval T0 between successive light pulses. There is a very long time span in which no useful signal arrives at the photodetectors.

Different measures can be taken to increase the signal level and to improve the signal-to-noise ratio.

Figure 11:
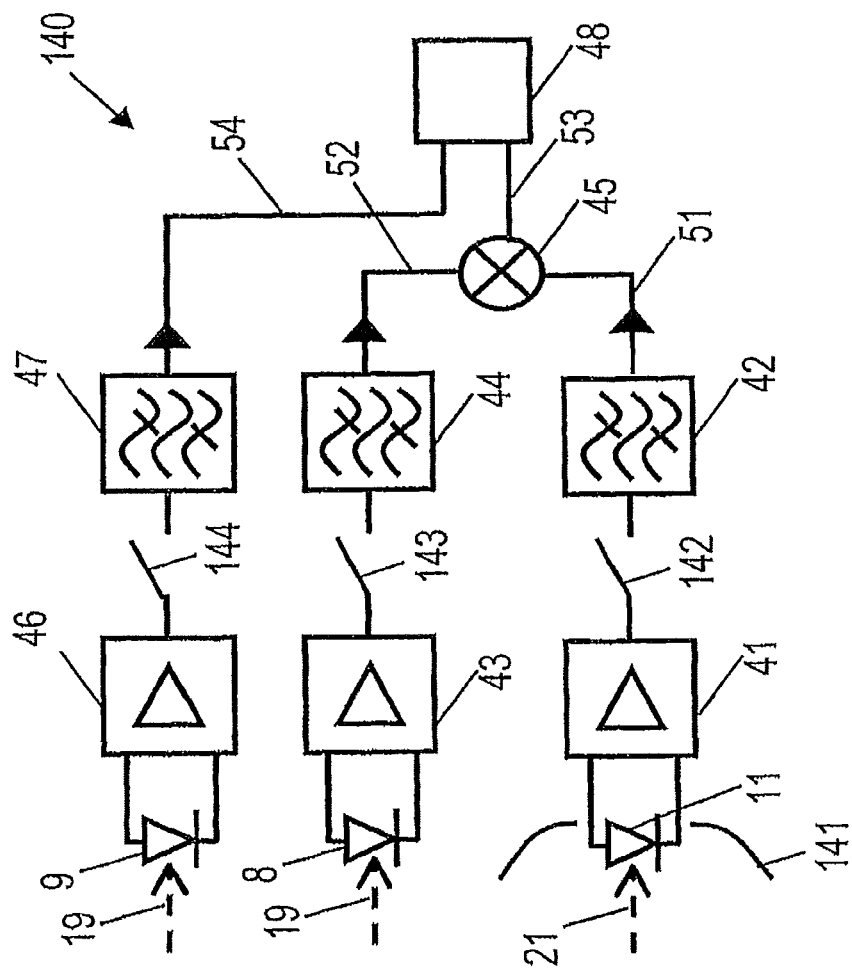
FIG. 11 is a schematic block circuit diagram of a further detector arrangement and evaluation circuit.

FIG. 11 is a schematic representation of measures which can be implemented on the detector arrangement and evaluation circuit of any one of the devices explained above. Components of the block circuit diagram of FIG. 11 which have an identical operation as components already explained with reference to FIG. 3 are designated with the same reference numerals and are not further explained here.

Each one of the photodetectors of the detector arrangement may be provided with an optical element 141, such as a lens or concave mirror, in order to increase the signal level. While only a concave mirror is schematically shown for the photodetector 111, each photodetector of the detector arrangement can be provided with a concave mirror or with a lens in a corresponding manner to increase the signal level.

The signal processing paths of the evaluation circuit 140 of FIG. 11 are provided with controllable switchable elements 142-144. These elements allow that a signal processing of the signals output by the photodetectors 11-14 and 8 and 9, respectively, to the evaluation circuit 140 is suppressed in time intervals in which none of the light pulses generated by the light source 3 can arrive at the photodetectors 11-14 and 8 and 9, respectively. The switchable elements 142-144, for example transistors, unblock the signal processing paths in time intervals in which no light pulses can impinge on the associated detector.

Noise which could contribute to a degradation of the signal-to-noise ratio during the time interval in which no useful signal is processed can be suppressed by such a selective deactivation of signal processing. The rather short time interval in which signals are detected and processed, i.e. the unblocking time for allowing a useful pulse to pass, is selected in dependence on the repetition rate and the expected maximum propagation time differences between near point and far point of a measuring segment, so as to ensure that each light pulse is detected and processed.

Figure 12:
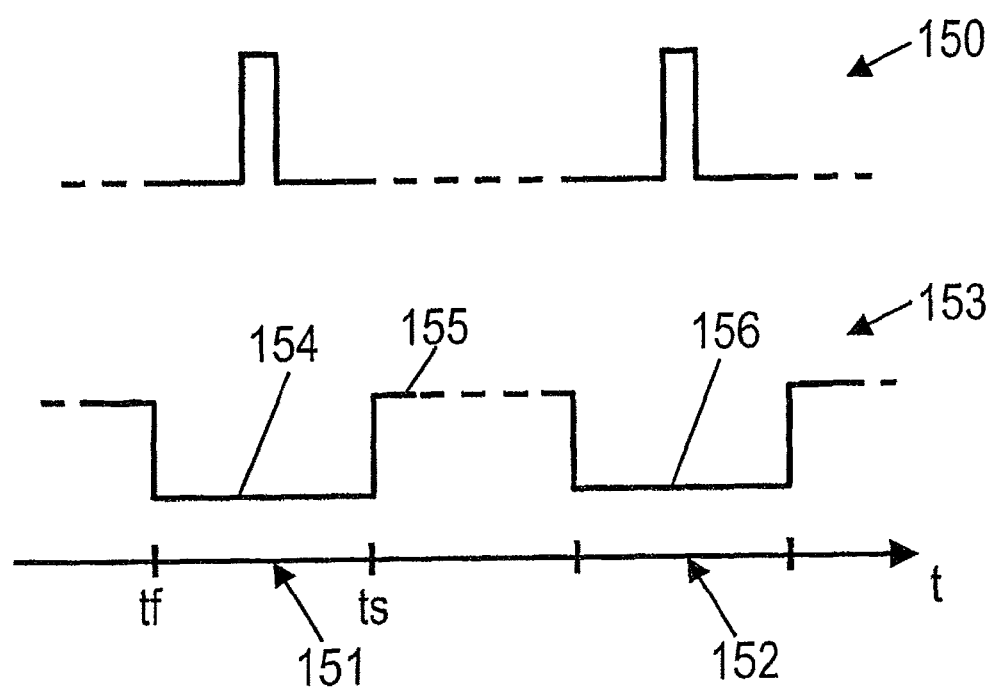
FIG. 12 illustrates switching states in the evaluation circuit of FIG. 11.

FIG. 12 exemplarily shows a useful signal 150 of a sequence of light pulses having a long time interval between the light pulses. FIG. 12 further shows a switching state 153 of a blocking device which allows signal detection and/or signal processing only in time intervals 151 and 152 in which a light pulse can arrive. The blocking device may be formed by controllable switches in the signal processing paths of the evaluation circuit. The limits of the time interval 151 are given by the earliest possible time of arrival, tf, of a light pulse and the latest possible time of arrival, ts, of the light pulse. In the time intervals 151 and 152, the blocking device has as switching state 154 and 156, respectively, which allows signal detection and signal processing to be performed, while the blocking device has a switching state 155 in which signal detection and/or signal processing are suppressed at any other time.

Figure 13:
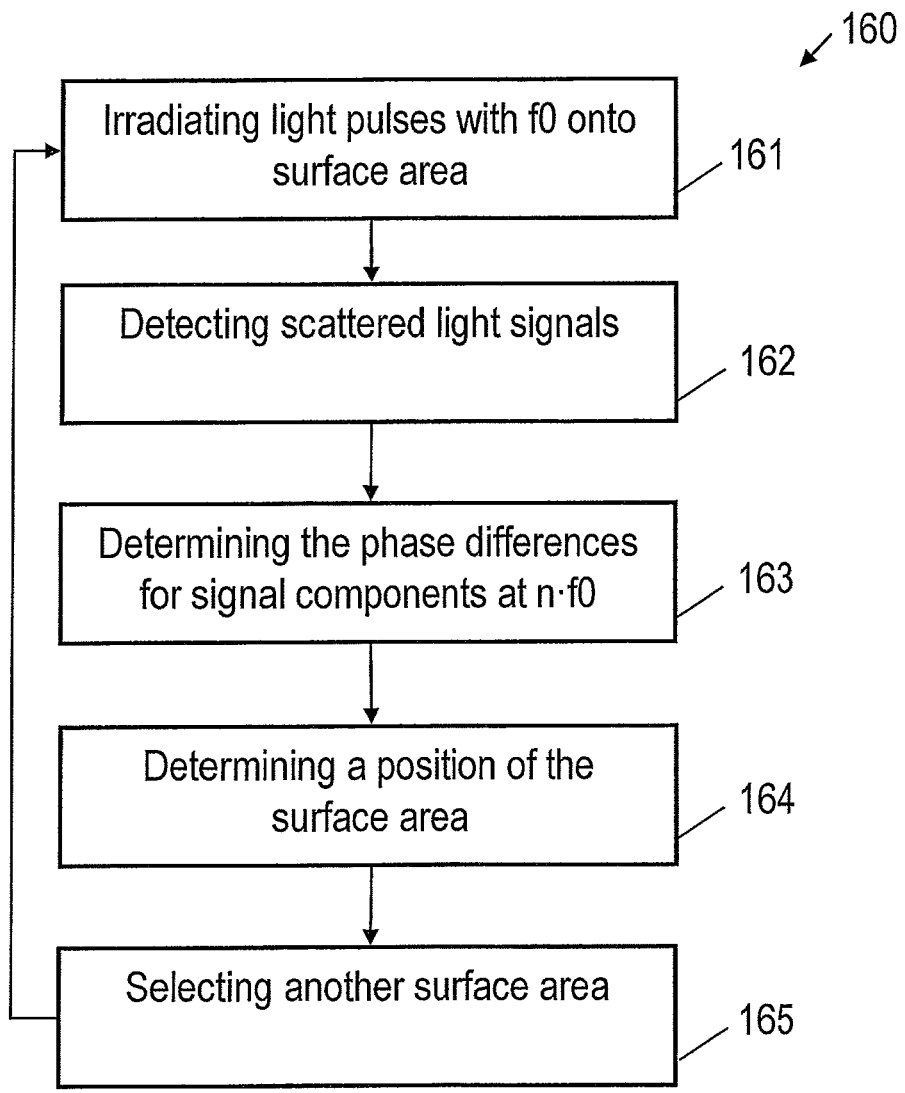
FIG. 13 is a flow diagram representation of a method according to an embodiment.

FIG. 13 is flow chart representation of a method 160 for measuring a surface. The method may be performed using the device 1 explained with reference to FIG. 1-6, the device 101 explained with reference to FIGS. 7 and 8, the device 111 explained with reference to FIG. 9, the device 131 explained with reference to FIG. 10 or a device according to another embodiment.

At 161, a sequence of light pulses with a repetition rate is irradiated onto a surface area. The sequence of light pulses may be irradiated using a controllable optical deflection device or using a hand apparatus.

At 162, plural light signals scattered by the surface area are detected. To this end, a plurality of photodetectors is used, the photodetectors being arranged such that none of the photodetectors is located on a straight line which passes through the surface area and another photodetector.

At 163, a phase shift of a signal component of the light signal is determined for each one of the light signals, the signal component being selected such that it has a frequency which corresponds to a multiple n·f0 of the repetition rate f0, with n>1. The signal component may be generated from the detected light signals using a band pass filter. The phase shift may be determined in relation to a reference signal component which has a frequency that also corresponds to the multiple n·f0 of the repetition rate f0.

At 164, the position of the surface area is determined based on the determined phase differences. In this case, three coordinates of the surface area may be determined.

At 165, a new surface area is selected, and steps 161 to 164 are repeated for the new surface area. The iteration is continued until the surface has been measured with sufficient accuracy, i.e. with a number or density of grid points which is sufficient for the measurement.

As has been explained in connection with Equations (2) to (6), determining the position of the surface area 164 may require that there is already a sufficiently good estimation value for the path lengths which are traversed by a light pulse from a reference point via the surface area to a photodetector. The estimation value has to be sufficiently accurate so that Equation (3) is fulfilled. This may for example be attained in that the surface is first surveyed with a less precise method and the results of the imprecise measurement are employed as estimation values for a new measurement of the surface using the method 160.

In another embodiment, method steps of the method 160 may be repeated in an iterative manner, with signal components having higher frequencies being evaluated with increasing iteration count. In the devices explained with reference to FIGS. 1 to 10, an iterative repetition for different signal components may be implemented by a suitable configuration of the evaluation circuit 15.

Figure 14:
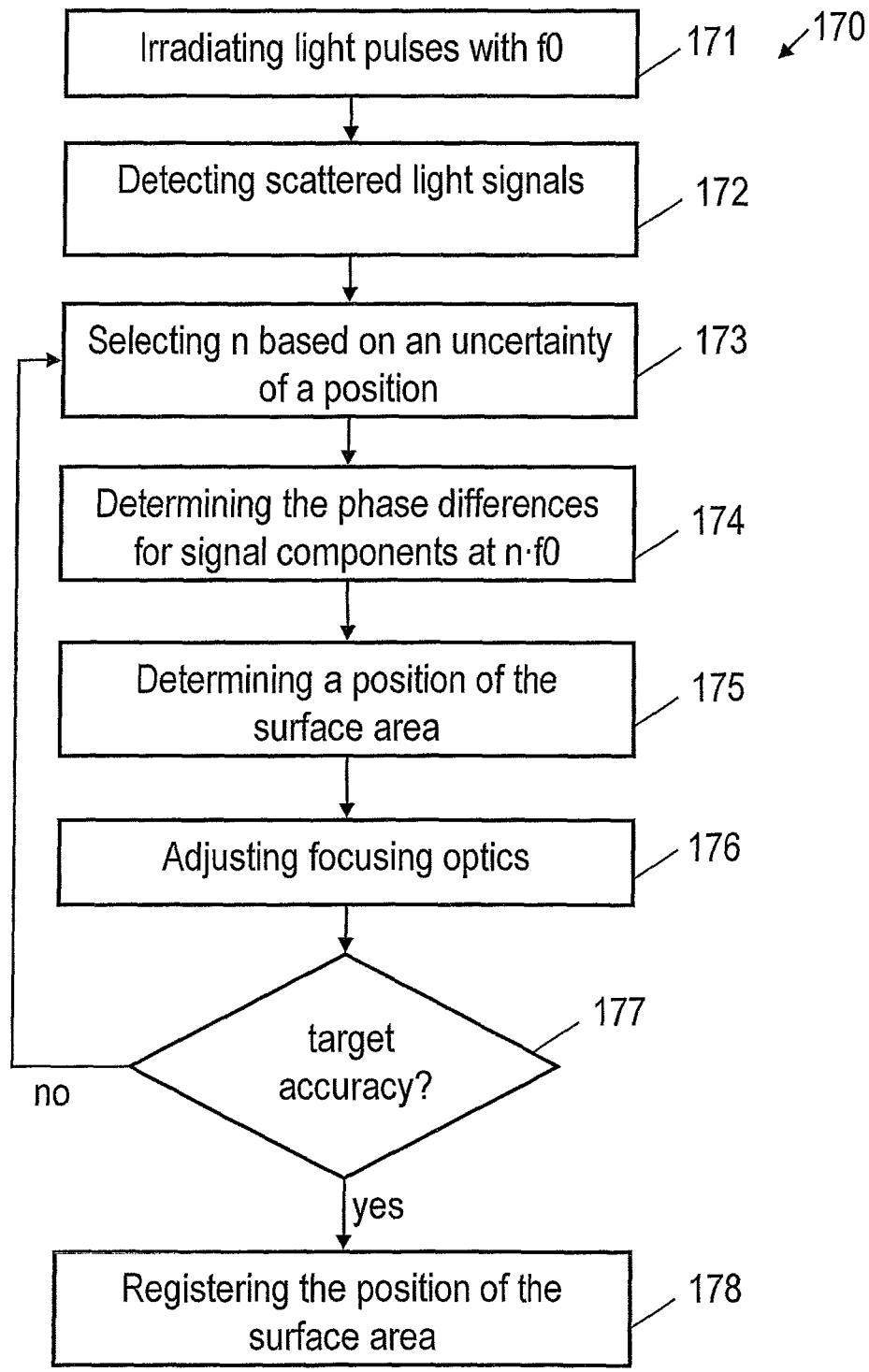
FIG. 14 is a flow diagram representation of a method according to another embodiment.

FIG. 14 is a flow diagram representation of a sequence of method steps 170 with which the determination of the position of a surface area can be iteratively improved.

At 171 and 172, a sequence of light pulses is irradiated and sequences of light pulses scattered by the surface area are detected, as in steps 161 and 162 of the method 160.

At 173, a natural number n is selected, with the phase difference being subsequently determined for the signal component having frequency n·f0. In this case, the number n is selected in dependence on the current uncertainty of the path length traveled by the light pulses or an accuracy of an already existing estimation value for the path length, so that Equation (3) is fulfilled. In particular, n may also be equal to 1 in the first iteration.

The subsequent steps 174 and 175 are implemented in the same way as steps 163 and 164 of the method 160, with an improved estimation for the path lengths traveled by the light pulses being determined based on the phase differences of the signal components having frequency n·f0 of plural light signals, and an improved position of the surface area being determined based on the improved estimation for the path lengths traveled by the light pulses.

At 176, a focusing optic may be adjusted based on the improved estimation for the position of the surface area, to reduce the beam diameter at the surface area and to enhance the lateral resolution of the surface measurement.

At 177, it is verified whether the position of the surface area has been determined with sufficient accuracy. If it is determined at 177 that the position of the surface area has been determined sufficient accuracy, at 178 the most recently determined position of the surface area is registered as a measured value for the measurement of the surface. Otherwise, steps 173-177 are repeated. After the position of the surface area has been determined with sufficient accuracy and has been registered, the sequence of method steps 170 may be repeated for other surface areas.

The devices and methods according to various embodiments of the invention allow a precise and contact-free determination of positions of surface areas when measuring a surface. The devices and methods may generally be used for measuring surfaces, with measurements of spaces for digitizing the spaces, for example in statics applications, or the quantitative quality control in industrial installations being exemplary areas of application.

The invention claimed is:

1. A device for measuring positions of plural surface areas of a surface, comprising:
   a light source for generating a sequence of light pulses with a repetition rate;
   a light directing device which is controllable to direct said sequence of light pulses onto a surface area of said surface which can be selected from plural surface areas;
   a detector arrangement comprising a plurality of detectors configured to receive a plurality of return light signals scattered and/or reflected by said surface area into different directions; and
   an evaluation circuit coupled to said detector arrangement and configured, for determining a position of said surface area, to determine, for each return light signal of said plurality of return light signals received by said detector arrangement, a phase difference between a reference signal derived from said sequence of light pulses and a return signal component of said return light signal, said return signal component respectively having a first frequency which corresponds to a first multiple of said repetition rate.

2. The device according to claim 1,
   said light directing device being controllable to direct plural sequences of light pulses onto said plural surface areas in a sequential manner for measuring said surface.

3. The device according to claim 1,
   said detector arrangement comprising at least three detectors, and
   said evaluation circuit being further configured to determine said position of said surface area in a three-dimensional space based on said determined phase differences,
   wherein said at least three detectors have predetermined relative positions relative to each other, said position of said surface area being determined based on said predetermined relative positions.

4. The device according to claim 3,
   said detector arrangement comprising at least four detectors,
   said evaluation circuit being further configured to also determine, based on said determined phase differences, a path length between said light directing device and said surface area, and
   said light directing device having focusing optics for said sequence of light pulses which can be adjusted based on said determined path length between said light directing device and said surface area.

5. The device according to claim 1,
   said light directing device further comprising a hand apparatus and an optical fiber coupled to said hand apparatus to receive said sequence of light pulses from said light source and to emit said sequence of light pulses towards said surface area.

6. The device according to claim 1,
   said detector arrangement and said evaluation circuit being integrated in an apparatus, a plurality of detectors of said detector arrangement being arranged on a side face of a housing of said apparatus.

7. The device according to claim 1, further comprising:
   a first reference signal detector which is arranged to detect a portion of said sequence of light pulses generated by said light source as a first reference signal and which is coupled to said evaluation circuit to provide said first reference signal thereto;
   said evaluation circuit being further configured to determine said phase difference as a phase difference between a first reference signal component of said first reference signal and said return signal component of each said plurality of return light signals, and
   said evaluation circuit having a first mixer for mixing said return signal component of each said plurality of return light signals and a second reference signal component of a second reference signal, wherein a second frequency of said second reference signal component is a second multiple of said repetition rate.

8. The device according to claim 7, further comprising:
   a second reference signal detector which is arranged to detect a portion of said sequence of light pulses generated by said light source as the second reference signal, said first mixer being coupled, at a first input side, to the second reference signal detector to receive said second reference signal component, and
   wherein said evaluation circuit further comprises a second mixer which is coupled, at an input side, to an output of said first mixer and to the first reference signal detector.

9. The device according to claim 1,
   said evaluation circuit being configured to determine, in an iterative manner, for plural return signal components of said each at least one return light signal having different frequencies respectively an associated phase difference, at least one of said plural return signal components having a frequency which corresponds to a multiple of said repetition rate.

10. The device according to claim 1,
    wherein said detector arrangement is provided with at least one optical element for increasing a signal level detected at said detector arrangement, and/or wherein said device comprises a blocking device configured to suppress incidence of light onto said detector arrangement and/or processing of signals by said evaluation circuit during a time interval which is determined based at least on said repetition rate of said sequence of light pulses.

11. The device according to claim 1, said light source comprising a short pulse laser.

12. The device according to claim 1, wherein a number of said detectors and an arrangement of said detectors of said detector arrangement is selected such that said position of said surface area can be determined based on said phase differences associated with return light signals detected by said plurality of detectors when an irradiation position from which said sequence of light pulses is irradiated onto the surface area is unknown.

13. The device according to claim 1, wherein the evaluation circuit is further configured to, for plural return signal components of each return light signal, respectively determine an associated phase difference in an iterative manner, the plural return signal components of each return light signal having different frequencies, and at least one of said plural return signal components of each return light signal having a frequency which corresponds to a multiple of said repetition rate.

14. The device according to claim 1, wherein detection of said plurality of return light signals and/or processing of output signals of said plurality of detectors is suppressed during a time interval which is determined based at least on said repetition rate and during which no light pulse scattered by said surface area can be detected.

15. A method of measuring a surface, wherein positions of plural surface areas of said surface are determined in a sequential manner,
wherein determining a position of a surface area comprises the following steps:
irradiating, using a light source, a sequence of light pulses with a repetition rate onto said surface area;
detecting, using a plurality of detectors, a plurality of return light signals which each include said sequence of light pulses scattered and/or reflected on said surface area into different directions; and
determining said position of said surface area, wherein, for each return light signal of said plurality of detected return light signals, an associated phase difference between a reference signal, which is determined based on said irradiated sequence of light pulses, and a return signal component of said return light signal is determined, said return signal component respectively having a first frequency which corresponds to a first multiple of said repetition rate.

16. The method according to claim 15, wherein at least three return light signals scattered by said surface area into at least three different directions are detected, and wherein said position of said surface area is determined in a three-dimensional space based on said determined phase differences.

17. The method according to claim 15, wherein irradiating the sequence of light pulses comprises using a light directing device which is controllable to direct said sequence of light pulses from said light source onto the surface area of said surface which can be selected from plural surface areas;
wherein the plurality of detectors are configured to receive the plurality of return light signals scattered and/or reflected by said surface area into different directions; and
wherein determining said position of said surface area is performed by an evaluation circuit coupled to said plurality of detectors.

18. The method according to claim 15, further comprising: the evaluation circuit, for plural return signal components of each return light signal, respectively determining an associated phase difference in an iterative manner, the plural return signal components of each return light signal having different frequencies, and at least one of said plural return signal components of each return light signal having a frequency which corresponds to a multiple of said repetition rate.

19. The method according to claim 15, wherein detection of said plurality of return light signals and/or processing of output signals of said plurality of detectors is suppressed during a time interval which is determined based at least on said repetition rate and during which no light pulse scattered by said surface area can be detected.

* * * * *